(12) United States Patent
Abrahamson et al.

(10) Patent No.: US 11,648,170 B1
(45) Date of Patent: May 16, 2023

(54) BRAKE SYSTEM FOR ASSISTIVE MOBILITY DEVICE

(71) Applicant: Wheelie LLC, Burlingame, CA (US)

(72) Inventors: Donna Abrahamson, Hillsborough, CA (US); Marie-Helene Gotcher, Hillsborough, CA (US); Elizabeth Fannon, Hillsborough, CA (US)

(73) Assignee: Wheelie LLC, Burlingame, CA (US)

( * ) Notice: Subject to any disclaimer, the term of this patent is extended or adjusted under 35 U.S.C. 154(b) by 312 days.

(21) Appl. No.: 16/931,378

(22) Filed: Jul. 16, 2020

Related U.S. Application Data

(60) Provisional application No. 62/874,897, filed on Jul. 16, 2019.

(51) Int. Cl.
*A61H 3/04* (2006.01)
*B60T 1/04* (2006.01)
(Continued)

(52) U.S. Cl.
CPC .................. *A61H 3/04* (2013.01); *B60T 1/04* (2013.01); *B60T 7/10* (2013.01); *F16C 1/18* (2013.01);
(Continued)

(58) Field of Classification Search
CPC ............. F16D 2125/28; F16D 2125/56; F16D 2125/60; F16D 67/02; F16D 49/22;
(Continued)

(56) References Cited

U.S. PATENT DOCUMENTS 4,653,613 A * 3/1987 Blancas .................. B62L 3/026
188/24.11
4,901,595 A * 2/1990 Ozaki ....................... B62L 3/02
74/551.8
(Continued)

FOREIGN PATENT DOCUMENTS

CN 107031779 B * 8/2019 ................ B62L 3/02
DE 4026058 A1 * 2/1992
(Continued)

OTHER PUBLICATIONS

Daisuke Chugo, et al., A Brake-based Assistive Wheelchair Considering a Seat Inclination, DOI: 10.5220/0006858001360143In Proceedings of the 15th International Conference on Informatics in Control, Automation and Robotics (ICINCO 2018)—vol. 2, pp. 136-143.
(Continued)

*Primary Examiner* — Robert A. Siconolfi
*Assistant Examiner* — Mahbubur Rashid
(74) *Attorney, Agent, or Firm* — Rimon Law, P.C.

(57) ABSTRACT

Provided are mechanisms and processes for a brake system for an assistive mobility device. Systems include a frame configured to provide support for a user, a plurality of wheels coupled to the frame and configured to enable motion of the frame, a plurality of brakes coupled to the plurality of wheels and configured to provide resistance to a rotation of the plurality of wheels when engaged. Systems also include a first handle coupled to the frame and configured to be grasped by the user. The first handle includes a first rotatable grip and a first rotational torque generator coupled to the plurality of brakes. Systems also include a second handle coupled to the frame and configured to be grasped by the user. The second handle includes a second
(Continued)

rotatable grip a second rotational torque generator coupled to the plurality of brakes.

15 Claims, 17 Drawing Sheets

(51) Int. Cl.
| | |
|---|---|
| B60T 7/10 | (2006.01) |
| F16C 1/18 | (2006.01) |
| F16D 65/28 | (2006.01) |
| F16D 49/00 | (2006.01) |
| F16D 121/14 | (2012.01) |
| F16D 125/60 | (2012.01) |

(52) U.S. Cl.
CPC ............ *F16D 49/00* (2013.01); *F16D 65/28* (2013.01); *A61H 2003/046* (2013.01); *F16C 2361/45* (2013.01); *F16D 2121/14* (2013.01); *F16D 2125/60* (2013.01)

(58) Field of Classification Search
CPC . F16D 41/30; F16D 55/2245; A01D 34/6812; A01D 2034/6843; B60L 2250/24; B60L 15/2009; B60T 11/046; B60T 7/08; B60T 7/102; B60T 8/00; B62K 23/06; B62K 23/04; Y10T 74/20438; Y10T 74/2042; Y10T 74/20684; Y10T 74/20558; B62M 25/04; B62M 25/02; B62B 17/08; B62L 3/02

See application file for complete search history.

(56) References Cited

U.S. PATENT DOCUMENTS

| | | | | | |
|---|---|---|---|---|---|
| 5,370,017 | A | * | 12/1994 | Krauer | B62L 3/026 74/489 |
| 5,437,206 | A | * | 8/1995 | Boor | B62L 3/026 74/489 |
| 5,615,580 | A | * | 4/1997 | Chen | B62K 23/04 74/489 |
| 5,676,020 | A | * | 10/1997 | Jordan | B62K 23/04 74/567 |
| 5,682,963 | A | * | 11/1997 | Tang | B62L 3/026 188/24.11 |
| 5,775,168 | A | * | 7/1998 | Furuta | B62M 25/04 74/489 |
| 5,802,927 | A | * | 9/1998 | Yu | B62L 3/026 74/489 |
| 6,021,688 | A | * | 2/2000 | Chang | B62K 23/04 74/489 |
| 6,041,895 | A | * | 3/2000 | Mao | B62L 3/026 74/489 |
| 6,209,413 | B1 | * | 4/2001 | Chang | B62M 25/04 74/489 |
| 6,212,969 | B1 | * | 4/2001 | Kuo | B62L 3/02 188/19 |
| 7,802,659 | B2 | * | 9/2010 | Huang | A61H 3/04 188/19 |
| 8,381,884 | B2 | * | 2/2013 | Watarai | B60T 1/06 188/24.12 |
| 8,827,284 | B2 | * | 9/2014 | Walther | B62K 5/023 280/87.041 |
| 9,289,077 | B1 | * | 3/2016 | Gyasi | A47D 13/04 |
| 9,505,423 | B2 | * | 11/2016 | Thorne | B62B 9/00 |
| 9,746,872 | B2 | * | 8/2017 | Thielvoldt | G05G 1/04 |
| 10,227,102 | B1 | * | 3/2019 | Ballou | B62J 3/14 |
| 2003/0230160 | A1 | * | 12/2003 | Ritchey | B62M 25/04 74/501.6 |
| 2010/0116598 | A1 | * | 5/2010 | Watarai | B60T 7/102 188/24.22 |
| 2019/0375480 | A1 | * | 12/2019 | Pankratz | B62K 23/04 |
| 2020/0146908 | A1 | * | 5/2020 | Harrison | A61G 5/1013 |

FOREIGN PATENT DOCUMENTS

| | | | | |
|---|---|---|---|---|
| DE | 20319309 | U1 * | 5/2004 | ............... B62L 3/026 |
| DE | 202010010458 | U1 * | 11/2010 | ............... B60T 7/10 |
| FR | 2669001 | A1 * | 5/1992 | ............... B62L 3/026 |
| KR | 20110039618 | A  * | 4/2011 | |
| KR | 200457329 | Y1 * | 12/2011 | |

OTHER PUBLICATIONS

Tetsuya Hirotomi, User-Adaptive Brake Assist System for Rolling Walkers, Journal of Robotics and Mechatronics vol. 33 No. 4, 2021, 8 pages.
Yuan Chang, et al., Sit-to-Stand and Mobility Assistance Device, Dept. of Mechanical Engineering University of Michigan, ME450 Winter 2010, Apr. 20, 2010, 117 pages.

* cited by examiner

US 11,648,170 B1

BRAKE SYSTEM FOR ASSISTIVE MOBILITY DEVICE

CROSS-REFERENCE TO RELATED APPLICATIONS

This application claims the benefit under 35 U.S.C. § 119(e) of U.S. Provisional Patent Application No. 62/874,897, filed on Jul. 16, 2019, which is incorporated herein by reference in its entirety for all purposes.

TECHNICAL FIELD

The present disclosure relates to mechanisms and processes directed to an assistive mobility device.

DESCRIPTION OF RELATED ART

Some assistive mobility devices may be walkers in which a user grips the walker to provide assistance during the process of walking. Accordingly, the walker may assist the user when in an upright position, and when in the process of a walking gait. Some assistive mobility devices may have wheels that facilitate movement of the walker along a hard surface. However, such assistive mobility devices remain limited in their ability to change or modify a speed of motion of the walker.

SUMMARY

Provided are various mechanisms and processes relating to an assistive mobility device. Systems include a frame configured to provide support for a user, a plurality of wheels coupled to the frame and configured to enable motion of the frame, a plurality of brakes coupled to the plurality of wheels and configured to provide resistance to a rotation of the plurality of wheels when engaged. Systems also include a first handle coupled to the frame and configured to be grasped by the user. The first handle includes a first rotatable grip and a first rotational torque generator coupled to the plurality of brakes. Systems also include a second handle coupled to the frame and configured to be grasped by the user. The second handle includes a second rotatable grip and a second rotational torque generator coupled to the plurality of brakes.

In some embodiments, the first rotational torque generator and the second rotational torque generator are each configured to rotate to a first position to apply a first amount of braking, and further configured to rotate to a second position to apply a second amount of braking. In various embodiments, the first amount of braking associated with the first position applies partial braking capable of slowing the motion of the frame, and the second amount of braking associated with the second position applies full braking capable of stopping the motion of the frame. According to some embodiments, the first rotational torque generator and the second rotational torque generator each include a catch and a spring configured to implement the first position and the second position. In some embodiments, the catch is a pawl coupled to the spring, and the pawl includes a plurality of teeth corresponding to the first position and the second position. In various embodiments, the catch is a detent coupled to the spring, and the detent includes a plurality of teeth corresponding to the first position and the second position. According to some embodiments, the catch is a piston coupled to the spring and a base, and the piston and the base each include a plurality of teeth corresponding to the first position and the second position. In some embodiments, the first rotational torque generator and the second rotational torque generator are coupled to the plurality of brakes via at least a first cable and a second cable. In various embodiments, the first cable is coupled to the catch of the first rotational torque generator, and the second cable is coupled to the catch of the second rotational torque generator.

Also disclosed herein are devices that include a first handle coupled to a frame configured to provide support for a user, the first handle being configured to be grasped by the user. The first handle includes a first rotatable grip and a first rotational torque generator coupled to a plurality of brakes. Devices also include a second handle coupled to the frame and configured to be grasped by the user. The second handle includes a second rotatable grip and a second rotational torque generator coupled to the plurality of brakes.

In some embodiments, the first rotational torque generator and the second rotational torque generator are each configured to rotate to a first position to apply a first amount of braking, and further configured to rotate to a second position to apply a second amount of braking. In various embodiments, the first rotational torque generator and the second rotational torque generator each include a catch and a spring configured to implement the first position and the second position. According to some embodiments, the catch is a pawl coupled to the spring, and the pawl includes a plurality of teeth corresponding to the first position and the second position. In some embodiments, the catch is a detent coupled to the spring, and the detent includes a plurality of teeth corresponding to the first position and the second position. In various embodiments, the catch is a piston coupled to the spring and a base, and the piston and the base each include a plurality of teeth corresponding to the first position and the second position.

Also disclosed herein are methods that include receiving, at a first handle, a first rotational force from a user, the first handle being coupled to a frame configured to provide support for a user, rotating a first rotational torque generator included in the first handle in response to receiving the first rotational force, tensioning a first cable coupled to the first rotational torque generator based, at least in part, on the received first rotational force, and activating at least one of a plurality of brakes in response to the tensioning of the first cable.

In some embodiments, the rotating of the first rotational torque generator includes rotating the first rotational torque generator to a first position to apply a first amount of braking and rotating the first rotational torque generator to a second position to apply a second amount of braking. In various embodiments, methods additionally include receiving, at the first handle, a second rotational force from a user, the second rotational force having an opposite direction as the first rotational force, rotating the first rotational torque generator in response to receiving the second rotational force, and releasing at least one of the plurality of brakes in response to the rotating. According to some embodiments, the first rotational grip includes a catch and a spring associated with the first position and the second position. In some embodiments, methods also include receiving, at a second handle, a second rotational force from the user, the second handle being coupled to the frame, rotating a second rotational torque generator included in the second handle in response to receiving the second rotational force, tensioning a second cable coupled to the second rotational torque generator based, at least in part, on the received second rotational force, and activating at least one of a plurality of brakes in response to the tensioning of the second cable. This and other embodiments are described further below with reference to the figures.

DETAILED DESCRIPTION OF EXAMPLE EMBODIMENTS

Figure 1:
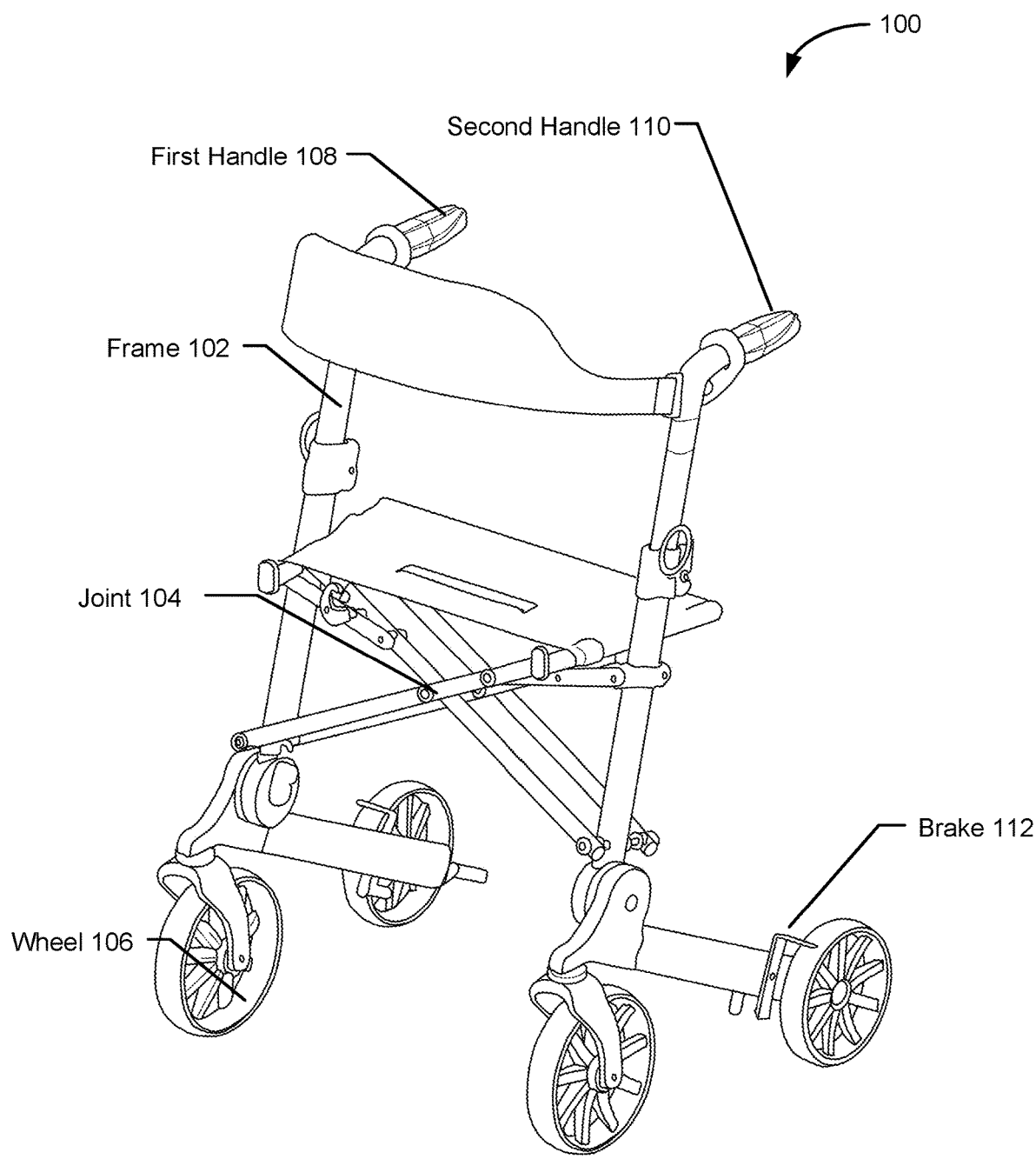
FIG. 1 illustrates an example of an assistive mobility device having a brake system, configured in accordance with some embodiments.

Reference will now be made in detail to some specific examples including the best modes contemplated by the inventors. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In addition, although many of the components and processes are described below in the singular for convenience, it will be appreciated by one of skill in the art that multiple components and repeated processes can also be used to practice the techniques of the present disclosure.

In the following description, numerous specific details are set forth in order to provide a thorough understanding of the embodiments disclosed herein. Particular embodiments may be implemented without some or all of these specific details. In other instances, well known process operations have not been described in detail in order not to unnecessarily obscure the description of the embodiments.

Users of walkers find it difficult and/or are not able to use many rolling walkers because of weak grip strength and/or arthritis in the hands, wrists, or elbows. Moreover, some rolling walker users suffer from fatigue in hands, wrists, arms, shoulders and neck from continually squeezing brakes during a walk, reducing endurance and stamina and limiting their use and enjoyment of the walker. Such rolling walkers can "get away" from users if a user lets go of a handle grip on even a slight slope, and such walkers can roll away from such users thus making them impractical for users having the weak grip strength described above.

Some embodiments of walkers include a lever in a handle that may be squeezed to apply some form of braking. Thus, the braking entails squeezing a lever below the handle grip on the walker, and such braking is difficult for people with weak grip strength or those who suffer from arthritis in their hands/wrists/elbows. The constant squeezing to brake for slowing or stopping increases user fatigue and reduces user stamina and endurance. As similarly discussed above, a walker will roll away if the user lets go of the handle on even a slight slope. Other braking systems, such as one with a push down to go, release to brake, bar also remain limited and are not intuitive.

Embodiments disclosed herein utilize an incremental braking system that is configured to set an appropriate brake level for the user. Braking systems disclosed herein are implemented using a rotatable grip that is configured to pull or push brake cables in designated increments, depending on whether the user is engaging or releasing the brakes. For example, the rotatable grip may pull or push the brake cables in increments of units such as inches or centimeters. Any suitable increment may be used. In some embodiments, a rotating left side grip is coupled to a cable that operates one or more brake bars on the left wheel(s). Moreover, a rotating right side grip may be coupled to a cable that operates one or more brake bars on the right wheel(s). In some embodiments, a user can rotate the handle grips to choose a desired braking resistance level: Go (no resistance), Slow (some resistance), Stop (wheels do not turn). In various embodiments, the left brake is set with a counter clockwise grip rotation; the right brake is set with a clockwise grip rotation. To release the brakes, the user rotates each handle grip in the opposite direction. While a particular implementation of clockwise and counter clockwise rotation has been described, the opposite may also be utilized. Moreover, according to some embodiments, both left and right grips rotate an equal number of steps to apply or release the brakes.

In the first position the brake bars (front and rear) are not in contact with any wheels and they are able to spin freely. When the rotational torque generator is rotated one step or "click" a brake bars-lightly touch the rear wheels and provides a small amount of friction. Accordingly, a rotational torque generator may be textured to have teeth to implement a ratchet-like rotation that is configured to provide "clicks" corresponding to increments of amounts of rotation. As the rotational torque generator is rotated one more time, it causes another brake bars to completely contact the back wheels and apply enough force to stop the wheels entirely. A third click may increase the pressure of the brake bar on the back wheels and may apply some pressure to the front wheels for a full stop. In various embodiments, this setting is also utilized as a parking brake that stops the walker from moving at all. In various embodiments, the "clicks" provided by the rotational torque generator enable the braking system to maintain braking even if the user releases the grip and associated handle. Accordingly, once engaged, the brakes will remain engaged until the user rotates the grip in the opposite direction to disengage the brakes. In this way, maintaining braking when in a "stop" setting does not require additional effort or continuous actuation, such as squeezing a lever, by a user, and braking may be maintained even if a user has a condition such as a weak grip or fatigue.

In various embodiments, the application of different brakes at different times is implemented based on a configuration of brake bar length as well as a coupling point or a point of attachment between the brake bar and a brake cable. In some embodiments, the rear brake bars are configured to have a shorter bars than the front brakes. When configured in this way, the rear brakes engage earlier than the front brakes when the brake cable is pulled. In various embodiments, the timing of the engagement of the brakes is tuned by setting an initial brake to tire gap spacing.

As will be discussed in greater detail below, embodiments disclosed herein can be used by people with weak grip strength and/or arthritis, and the handle grip rotation does not require hand strength. Accordingly, a variety of users can rotate the handle, set the braking resistance and continue with a relaxed, supportive grip on the handles. In this way, there is no fatigue from squeezing brake bars. If the user lets go of the walker while the brakes are set, the brakes continue to be activated and the walker will remain stationary. Moreover, a reverse rotation releases the brake.

Accordingly, braking systems disclosed herein allow more people to use a rolling walker. Furthermore, such rotating handle grips provide a simple and intuitive control system. Users are able to walk farther and with more comfort as the rotational braking system removes the fatigue caused by continually squeezing brake bars. If the user lets go of the walker for any reason while the brakes are engaged, it remains slow to stationary, depending on the brake setting and resistance selected by the user.

As will also be discussed in greater detail below, the right and left handle grips are configured to rotate the same distance with the same number of steps. In some embodiments, where the two sides rotate in different directions, each grip is specifically configured for its particular side. Moreover, as will also be discussed in greater detail below, the amount of pressure utilized to rotate the handle grip is configured to utilize an amount of pressure that ensures easy braking for a wide range of users, while also keeping the resistance firm enough to prevent braking unintentionally.

FIG. 1 illustrates an example of an assistive mobility device having a brake system, configured in accordance with some embodiments. As discussed above, an assistive mobility device may be used by a user to facilitate the process of walking by providing support during a walking gait. As shown in FIG. 1, an assistive mobility device, such as assistive mobility device 100, includes various components to assist the user, as well as provide an incremental braking system. As will be discussed in greater detail below, assistive mobility device 100 includes a braking system that is configured to selectively engage a designated amount of braking to control or stop the motion of assistive mobility device 100, and in a manner that is accessible for users having a weak grip strength.

In various embodiments, assistive mobility device 100 includes frame 102 that is configured to provide structural support for components of assistive mobility device 100. As shown in FIG. 1, frame 102 may be collapsible and configured to fold using one or more joints. Thus, according to some embodiments, frame 102 has a left and a right side that are joined via one or more other components, such as joint 104. In this way, frame 102 may be collapsed, and assistive mobility device 100 may be folded to facilitate transportation or storage. As will be discussed in greater detail below, the routing of braking cables may be configured to facilitate such folding, and brake systems disclosed herein may be compatible with foldable frames.

In various embodiments, frame 102 may be coupled to various other components such as wheels 106, components of a brake system, and various handles, such as first handle 108 and second handle 110. Accordingly, a user may be able to grab assistive mobility device 100 via handles, such as first handle 108 and second handle 110, and such handles may provide support for the user. In various embodiments, the user may grab the handles at a particular location, such as a grip, and may manipulate the handles to operate the brakes of assistive mobility device 100. For example, the grip of first handle 108 may be rotated in a clockwise direction to engage the brake, and may be rotated in a counter clockwise direction to disengage the brake. Moreover, the grip of second handle 110 may be rotated in a counter clockwise direction to engage the brake, and may be rotated in a clockwise direction to disengage the brake. As will be discussed in greater detail below, the grip may rotate with other components of the handles to implement the braking. For example, the grip may rotate with a rotational torque generator to manipulate the brakes. In this way, the control handles for the brakes may be independently operable such that left and right side brakes are controlled independently. Moreover, in various embodiments, each grip of each handle is configured to implement a tension control such that the resistance of each of the grips is independently configurable. As discussed above, while implementations of clockwise and counter clockwise rotation have been described, any suitable implementation of clockwise and counter clockwise rotation may be used, such as clockwise rotation to engage braking, and counter clockwise rotation to disengage braking.

As discussed above, assistive mobility device 100 may be configured to move via one or more wheels, such as wheels 106. As shown in FIG. 1, assistive mobility device 100 includes four wheels and has two front wheels as well as two rear wheels. While FIG. 1 provides one example of an implementation of wheels, it will be appreciated that assistive mobility device 100 may include any suitable number of wheels to facilitate mobility of the user.

As will be discussed in greater detail below, the wheels may each be coupled to a brake that is configured to reduce or prevent rotation of a wheel when engaged. More specifically, the motion of the wheels may be regulated via one or more brakes such as brake 112. Accordingly, the brakes may be engaged using components, such as cables, to couple the brakes to the handles. In various embodiments, the front brakes and rear brakes may be selectively engaged based on an amount of braking applied via the brake system. For example, if a first amount of braking is applied, as may be the case with a "slow" setting, an amount of braking may be applied to the rear wheels such that one brake bar associated with the rear wheels contacts the rear wheels and provides resistance to rotation. In this way, the amount of braking may be used to control the speed of the assistive mobility device. If a second amount of braking is applied, as may be the case with a "stop" setting, another rear wheel brake bar may be applied with more pressure and the front brake bar(s) may be applied after the rear brakes are engaged. In this way, multiple brake bars may be engaged to stop movement of the assistive mobility device. Additional details of the brakes, such as brake 112, are discussed in greater detail below.

While two settings have been described, it will be appreciated that various additional settings may be implemented as well to implement additional combinations of the selective application of the different brakes to their respective wheels. For example, a "slow" setting may be implemented such that an amount of braking is applied to at least some of the wheels to provide some resistance to rotation of the wheels, and to provide additional control over the motion of the assistive mobility device. In various embodiments, each of the brakes is controlled via its own control cable which is coupled to a component of the braking system, such as a rotational torque generator. In various embodiments, two wheels may have brakes. For example, the rear wheels may have brakes while the front wheels do not.

In various embodiments, handles, such as first handle 108 and second handle 110, are configured to include visual indicators of the currently selected amount of braking. For example, a portion of a handle may have a clear window configured to provide a view of a set of indices corresponding to different amounts of braking. Such indices may be graphical cues such as numbers, colors, and/or directional arrows. In one example, the visual indicators are configured to display the color green when no braking is applied and the wheels are free to roll, and may also display colors such as yellow when the partial braking is applied, and red when the full braking is applied. In one example, the indices may be printed on one portion of the handle, such as a base, and the window may be included in another portion of the handle that is rotated, such as the shifter or grip.

Figure 2A:
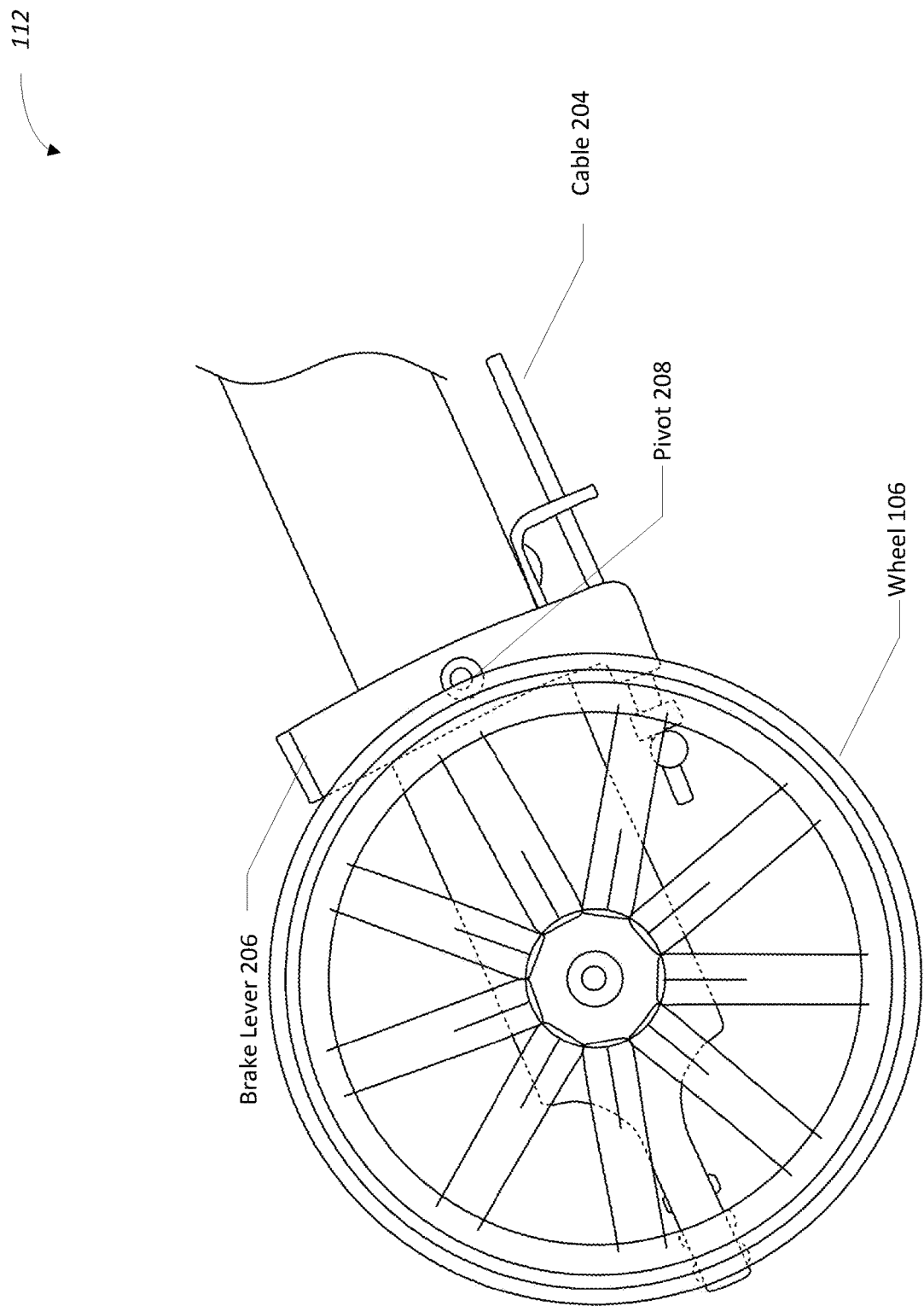
FIG. 2A illustrates an example of a brake coupled to a wheel, configured in accordance with some embodiments.

FIG. 2A illustrates an example of a brake coupled to a wheel, configured in accordance with some embodiments. As discussed above, various brakes, such as brake 112, may be included in an assistive mobility device. As shown in FIG. 2A, a wheel, such as wheel 106, may be rotatably coupled to a portion of a frame, such as leg 202. Accordingly, the wheel may freely rotate at the point of coupling, and thus enable movement of the frame along a surface that contacts the wheel.

In various embodiments, brake 112 is coupled to a cable, such as cable 204 which may be controlled via operation of a rotatable grip, as discussed above. Accordingly, brake 112 may include brake bar 206 which is configured to move or rotate around pivot 208 when receiving a force from cable 204. For example, cable 204 may pull on an end of brake bar 206 to manipulate a position of an opposite end of brake bar 206 such that in a first position, the opposite end of brake bar 206 does not contact wheel 106, and in a second position, the opposite end of brake bar 206 does contact wheel 106. When contacting wheel 106, brake bar 206 provides resistance to the rotation of wheel 106, and when sufficient force is applied via cable 204, brake bar 206 prevents the rotation of wheel 106. As will be discussed in greater detail below, the amount of force applied by brake bar 206 may be controlled by different amounts of tension that pull or push cable 204 as determined by different positions of the grips and rotational torque generators discussed in greater detail below.

Figure 2B:
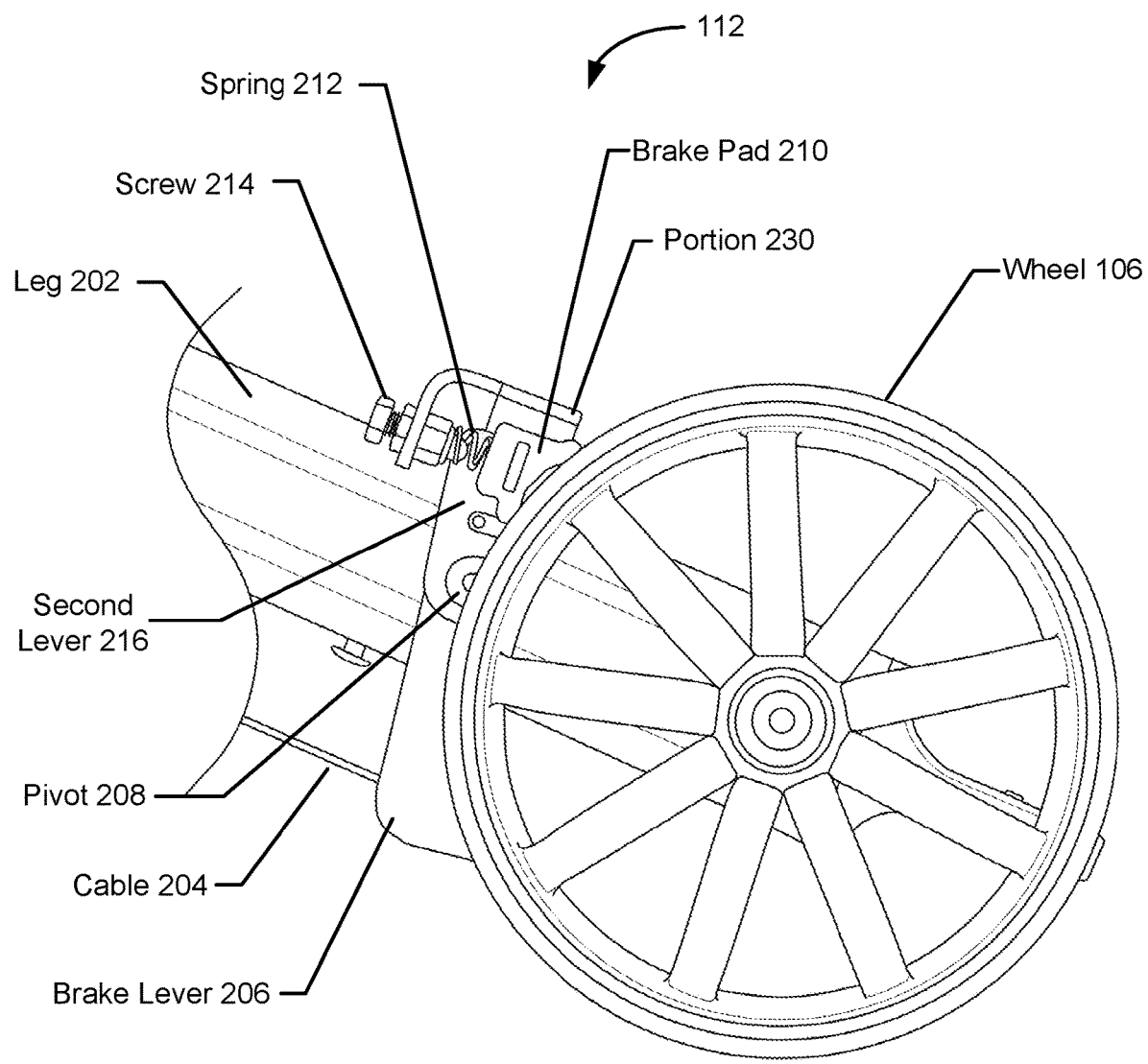
FIG. 2B illustrates another example of a brake coupled to a wheel, configured in accordance with some embodiments.

FIG. 2B illustrates another example of a brake coupled to a wheel, configured in accordance with some embodiments. As discussed above, various brakes, such as brake 112, may be included in an assistive mobility device. As similarly discussed above and as shown in FIG. 2B, a wheel, such as wheel 106, may be rotatably coupled to a portion of a frame, such as leg 202. As also discussed above, brake 112 is coupled to a cable, such as cable 204 which may be controlled via operation of a handle, as discussed above.

Moreover, brake 112 may include brake bar 206 which is configured to move or rotate around pivot 208 when receiving a force from cable 204, and may have a portion that is configured to contact wheel 106 when braking is applied. As also shown in FIG. 2B, brake 112 may further include brake pad 210 which is configured to contact wheel 106 when braking is applied. Accordingly, when in a first position, brake pad 210 does not contact wheel 106, and in a second position, brake pad 210 does contact wheel 106. When contacting wheel 106, brake pad 210 provides resistance to the rotation of wheel 106 and acts to slow down the assistive mobility device.

In various embodiments, brake 112 further includes spring 212 that is coupled to brake pad 210. As shown in FIG. 2A, spring 212 is configured to maintain and enhance mechanical coupling between brake pad 210 and wheel 106 when braking is applied. Brake 112 may also include adjustment screw 214 that is configured to adjust a compression force generated by spring 212 so that the amount of contact and frictional force between brake pad 210 and wheel 106 may be increased or decreased, and the amount of slow down braking of the assistive mobility device is correspondingly increased or decreased. Accordingly, when the grip, as discussed above, is rotated a first amount to apply a first amount of braking, brake pad 210 may contact wheel 106 to slow down movement of the assistive mobility device. When a second amount of braking is applied, brake bar 206 will also contact wheel 106 and provide additional resistance to the rotation of wheel 106 and fully stop the assistive mobility device.

Figure 2C:
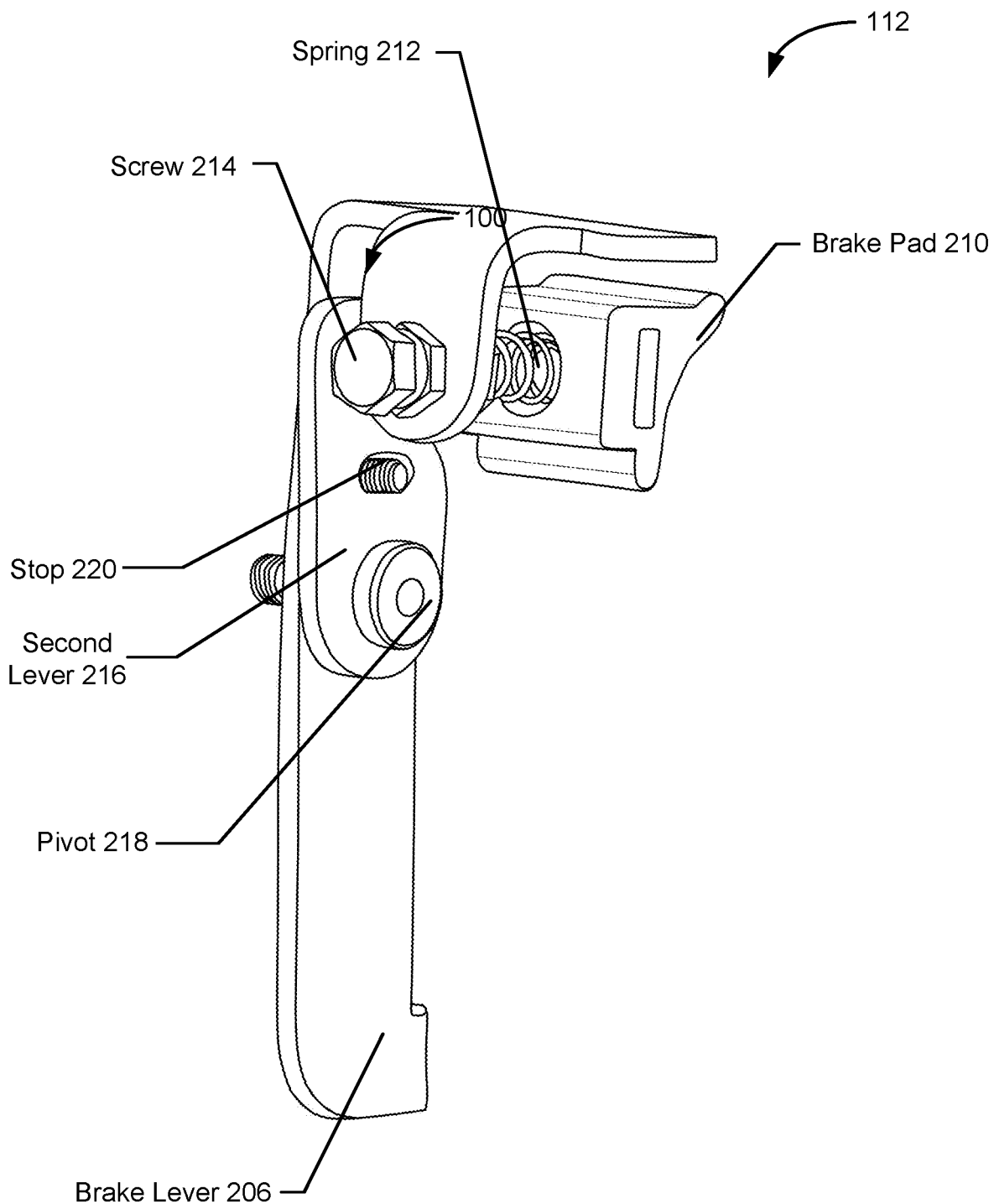
FIG. 2C illustrates an additional view of an example of a brake, configured in accordance with some embodiments.

FIG. 2C illustrates an additional view of an example of a brake, configured in accordance with some embodiments. In various embodiments, brake pad 210 is configured to provide a slow-down mechanism for wheel 106, and brake bar 206 is configured to provide a full stop mechanism for wheel 106. As discussed above, brake 112 may include various components, such as brake bar 206 that may be coupled to brake pad 210 via one or more components, such as spring 212 and adjustment screw 214. FIG. 2C illustrates additional detail regarding second lever 216. For example, second lever 216 may be coupled to brake bar 206 via pivot 218, and may also be coupled to brake pad 210. In various embodiments, stop 220 is configured to constrain a movement and rotation of second lever 216 along a particular range of motion, and also configured to stop a movement of second lever 216 and brake pad 210 from exceeding that allowed range of motion, as may be determined by a slot and a screw as shown in FIG. 2C.

Figure 2D:
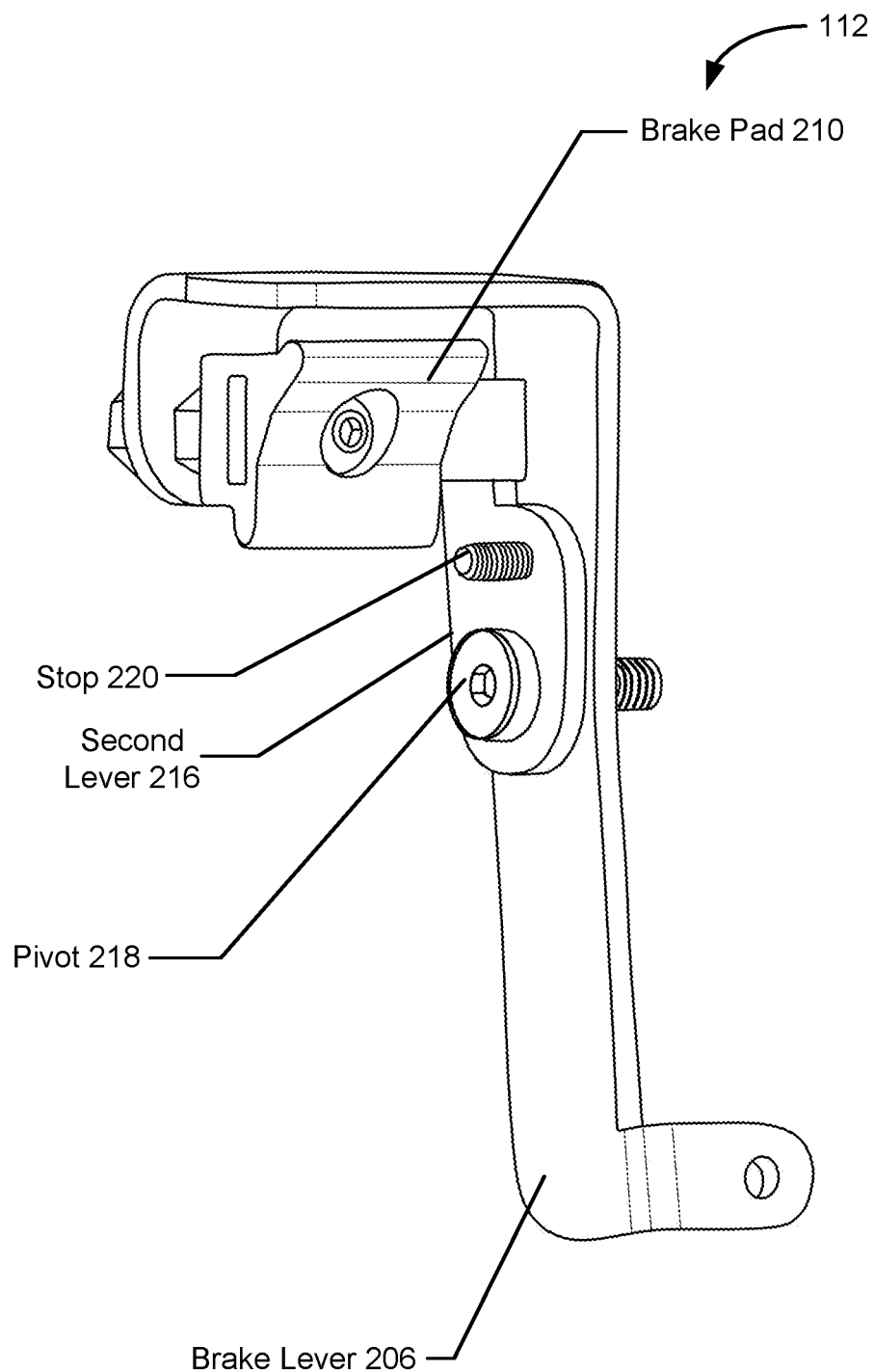
FIG. 2D illustrates another view of an example of a brake, configured in accordance with some embodiments.

FIG. 2D illustrates another view of an example of a brake, configured in accordance with some embodiments. As discussed above, brake 112 may include various components, such as brake bar 206, brake pad 210, second lever 216, pivot 218, and stop 220. FIG. 2D illustrates additional detail of brake pad 210 and a shape or geometry of brake pad 210. As shown in FIG. 2D, brake pad 210 may have a shape or geometry that is configured based on a shape of wheel 106. For example, brake pad 210 may have a curvature that is configured to compliment a curvature of wheel 106 to ensure mechanical coupling between the two. In one example, brake pad 210 and wheel 106 may have a same radius of curvature.

Figure 3:
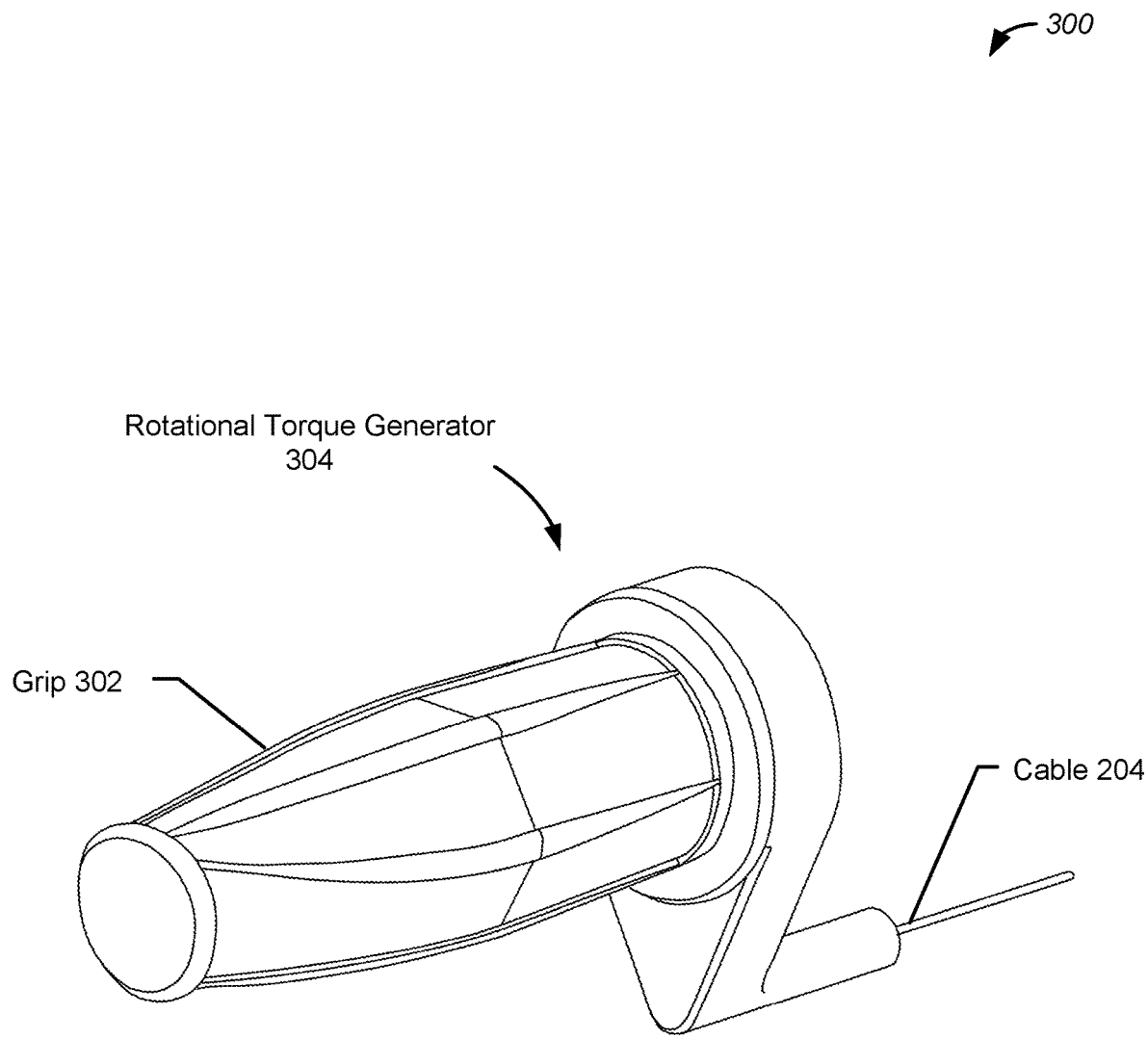
FIG. 3 illustrates an example of a handle, configured in accordance with some embodiments.

FIG. 3 illustrates an example of a handle, configured in accordance with some embodiments. In various embodiments, a handle, such as handle 300, is configured to be gripped by a user at a particular location, such as grip 302. As shown in FIG. 3, grip 302 is configured to be bi-directionally rotatable such that it may be rotated in a clockwise and counter-clockwise direction. In various embodiments, grip 302 is coupled to rotational torque generator 304 which is configured to convert a rotational force received at grip 302 into a linear tension force used to control operation of a cable, such as cable 204, and engage and disengage designated amounts of braking as discussed above. As will be discussed in greater detail below, various components of rotational torque generator 304 may be specifically configured to implement one or more amounts of resistance to slow an assistive mobility device as well as an amount of resistance to stop assistive mobility device.

Moreover, while various embodiments described herein describe a grip, such as grip 302 being rotatable, it will be appreciated that grip 302 may be configured to have a rotatable portion and a fixed portion. For example, a first portion of grip 302 may be fixed, and may be internally coupled to a base of handle 300. Moreover, a second portion of grip 302 may be rotatable, such as a rotatable collar adjacent to a shifter of handle 300. In this way, grip 302 may be configured such that a fixed portion is provided that enables the user to have a stationary portion to grab while also being provided with a rotatable portion for braking control.

Figure 4:
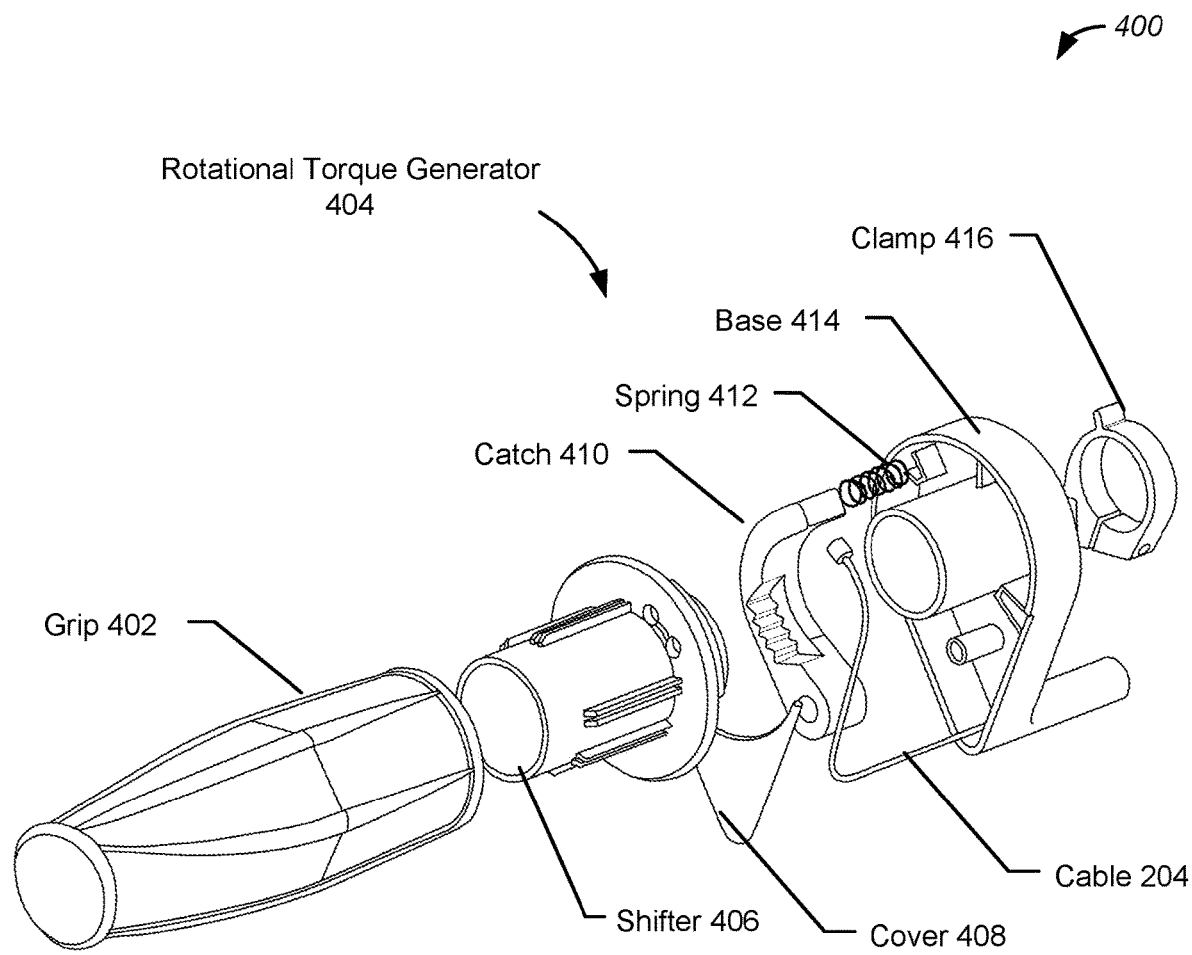
FIG. 4 illustrates another example of a handle, configured in accordance with some embodiments.

FIG. 4 illustrates another example of a handle, configured in accordance with some embodiments. More specifically, FIG. 4 illustrates an exploded view of one example of a handle, such as handle 400. As similarly discussed above, handle 400 may include grip 402 and rotational torque generator 404 which may be coupled to cable 204. As shown in FIG. 4, rotational torque generator 404 may include various components that are configured to engage and disengage braking as discussed above. For example, rotational torque generator 404 may include shifter 406, cover 408, catch 410, spring 412, base 414, and clamp 416.

In various embodiments, shifter 406 is configured to mechanically couple to grip 402, and thus transfer rotational force from grip 402 to other components of rotational torque generator 404 and ultimately to cable 204 and its associated brakes. Accordingly, shifter 406 is configured to have one or more mechanical coupling mechanisms that are configured to couple with grip 402 and provide mechanical coupling between the two. In some embodiments, such mechanical coupling mechanisms may be splines or ridges. It will be appreciated that any suitable mechanical coupling mechanism may be implemented. As will be discussed in greater detail below, shifter 406 is configured to couple with catch 410 via a mechanical interface. In one example, catch 410 is a pawl that includes teeth that are configured to interface with teeth of shifter 406. Accordingly, the teeth included in catch 410 and shifter 406 may correspond to different braking positions and different amounts of braking. Additional details of such positions are discussed in greater detail below.

As also shown in FIG. 4, catch 410 is coupled to spring 412, and is thus spring loaded. More specifically, spring 412 is configured to provide a force that pushes catch 410 against shifter 406 at the interface, and ensures sufficient mechanical coupling between the two. In various embodiments, shifter 406 is coupled to cable 204 and this converts the previously described rotational force into a tension applied to cable 204. In this way, the positions corresponding to amounts of rotation are converted to amounts of force applied to cable 204, and amounts of braking applied to brakes coupled to cable 204. As discussed above, rotational torque generator 404 also includes base 414, clamp 416, and cover 408 which are configured to structural support and enclosure for the other components of rotational torque generator 404. In various embodiments, while a rotational torque generator is described, any suitable mechanism may be used. For example, a lever may be implemented that is coupled to shifter 406. Accordingly, instead of rotating grip 402, the lever may be pushed or pulled to manipulate a position of shifter 406 and cause changes in the amount of braking applied.

Figure 5A:
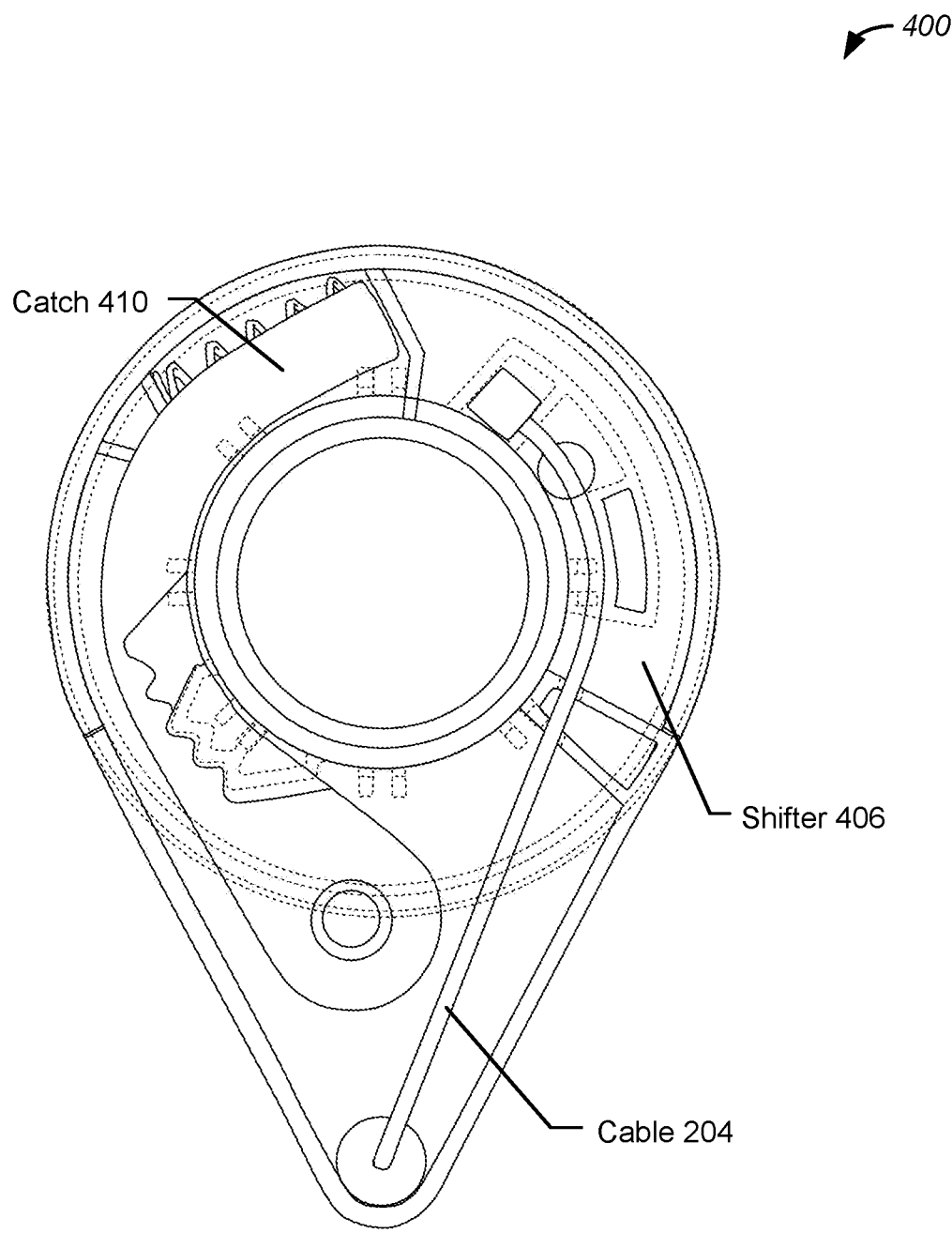
FIG. 5A illustrates an additional view of the handle, configured in accordance with some embodiments.

FIG. 5A illustrates an additional view of the handle, configured in accordance with some embodiments. Accordingly, FIG. 5A illustrates an additional view of handle 400. As shown in FIG. 5A, an end of cable 204 is held by shifter 406 such that rotation of shifter 406 affects a tension of cable 204. Furthermore, FIG. 5A illustrates an interface between shifter 406 and catch 410 via several teeth. As shown in FIG. 5A, the teeth are configured to provide a ratcheting capability to the rotation of shifter 406 that enables shifter 406 to advance through various rotational positions. Moreover, the teeth included in the interface enable shifter 406 to rest in each position despite the tension on cable 204. As discussed above, catch 410 may be a pawl. Accordingly, as shown in FIG. 5A, catch 410 is a pawl that is a lever configured to rotate at a pivot point set at one of its ends. In this way, catch 410 may move to enable rotation when sufficient rotational force is applied.

Figure 5B:
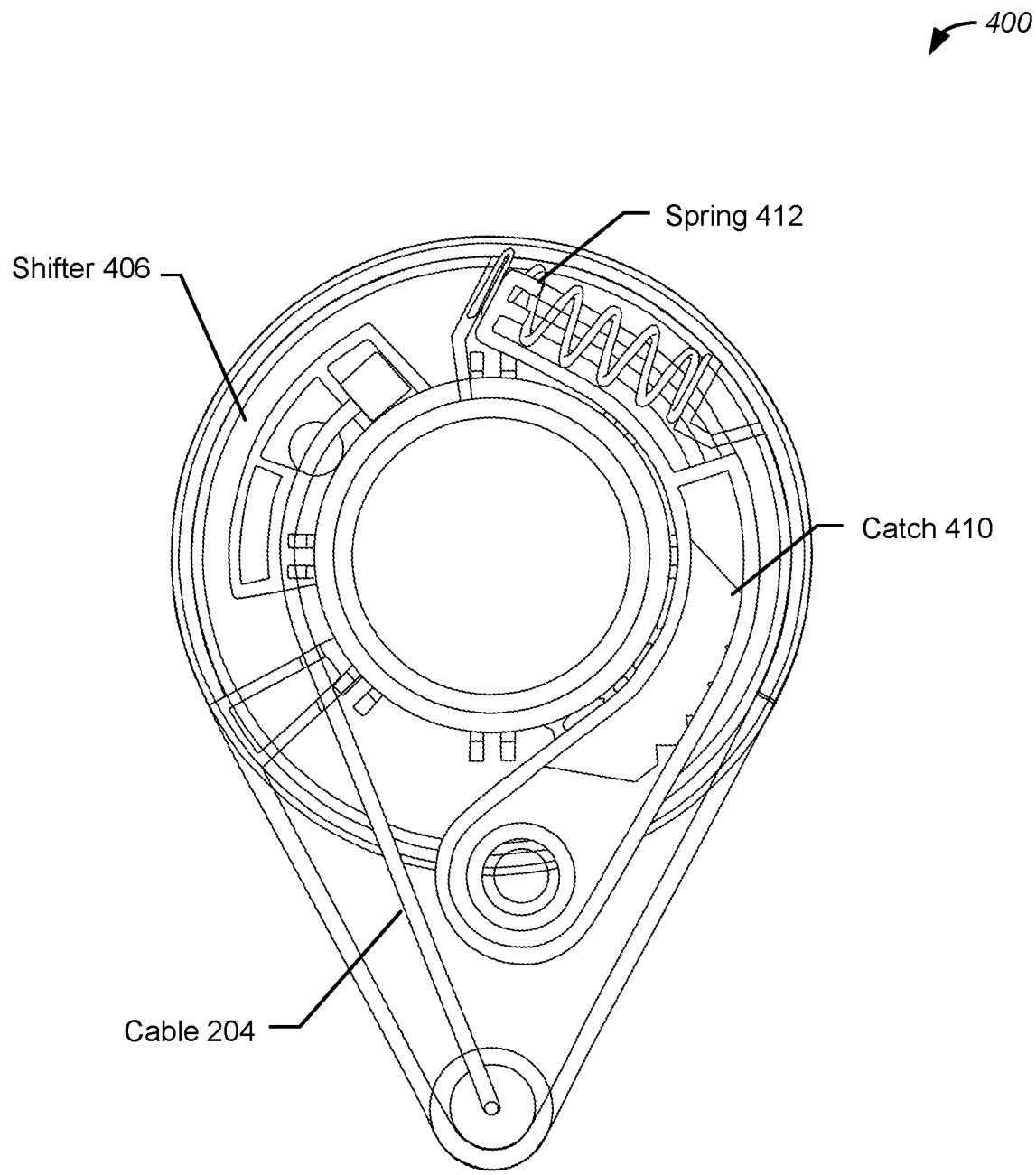
FIG. 5B illustrates another view of the handle, configured in accordance with some embodiments.

FIG. 5B illustrates another view of the handle, configured in accordance with some embodiments. Accordingly, FIG. 5B illustrates another view of handle 400. As discussed above, an end of cable 204 is held by shifter 406, and shifter 406 may couple with catch 410 via an interface. As additionally shown in FIG. 5B, spring 412 may be oriented to push catch 410 into shifter 406 and thus ensure proper mechanical coupling at the interface between the two. While FIG. 5B illustrates one example of a spring, it will be appreciated that any suitable type of spring may be used, or any other suitable device capable of storing mechanical energy.

Figure 6A:
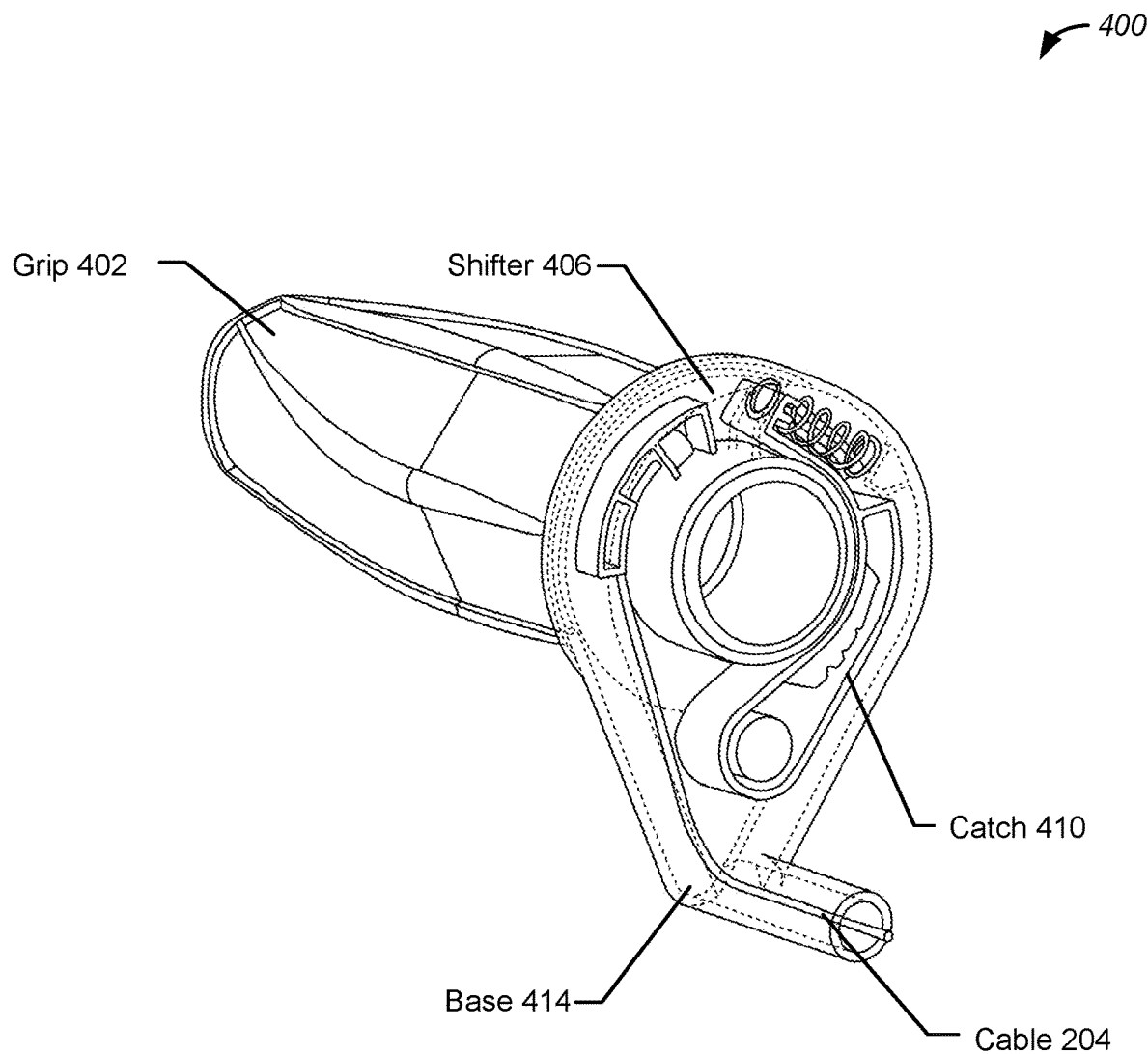
FIG. 6A illustrates yet another view of the handle, configured in accordance with some embodiments.

FIG. 6A illustrates yet another view of the handle, configured in accordance with some embodiments. Accordingly, FIG. 6A simply illustrates a view similar to that of FIG. 5A, but with the addition of the display of coupling with a grip, such as grip 402. Accordingly, FIG. 6A provides an additional view displaying the coupling between grip 402, shifter 406, catch 410, base 414, and cable 204, and provides additional clarification of the use of mechanical features, such as ridges or splines, for coupling between grip 402 and shifter 406.

Figure 6B:
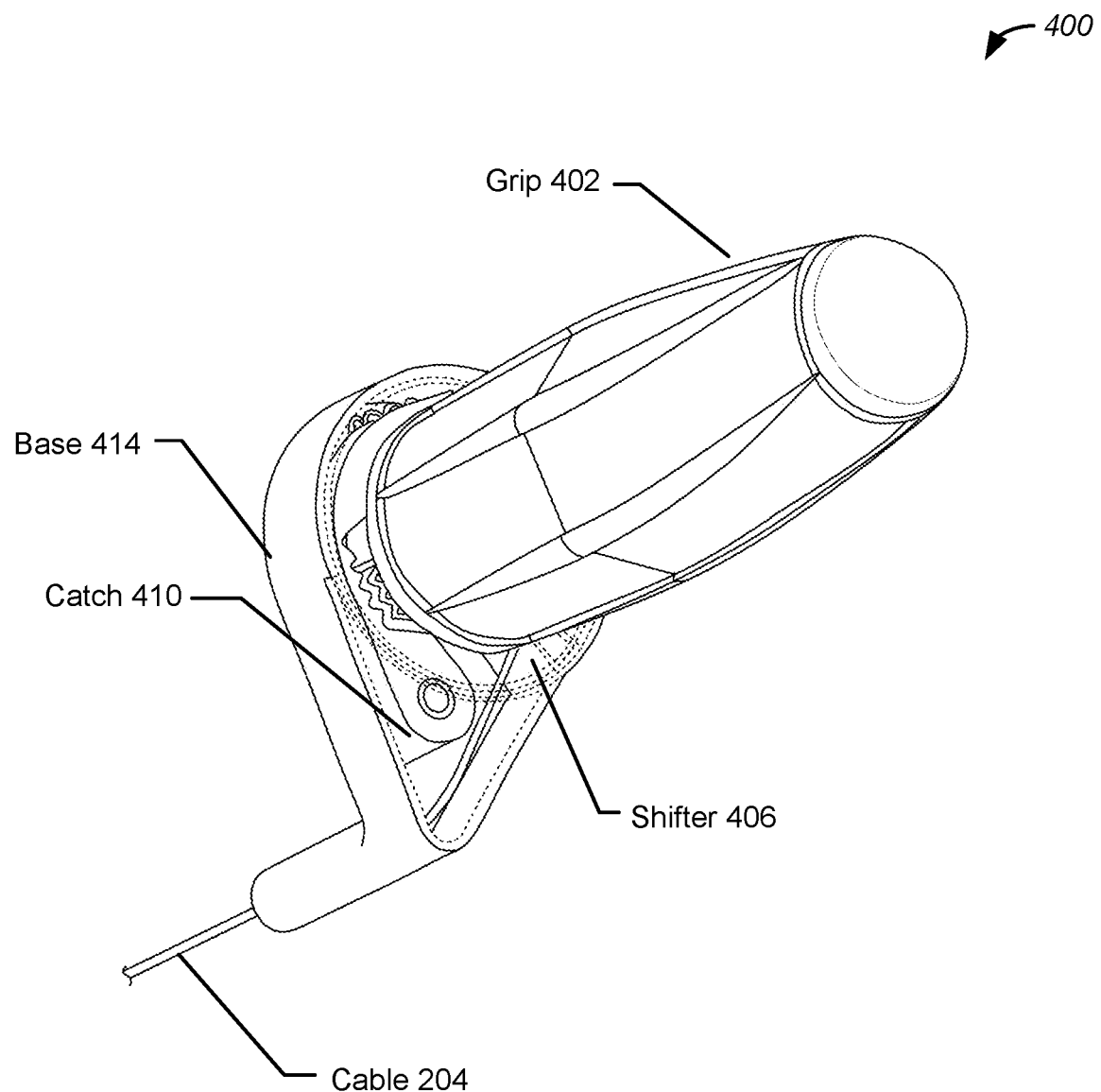
FIG. 6B illustrates an additional view of the handle, configured in accordance with some embodiments.

FIG. 6B illustrates an additional view of the handle, configured in accordance with some embodiments. Accordingly, FIG. 6B illustrates a view similar to that of FIG. 5B, but with the addition of the display of coupling with a grip, such as grip 402. Accordingly, FIG. 6B provides an additional view displaying the coupling between grip 402, shifter 406, catch 410, base 414, and cable 204, and provides additional clarification of the spring loaded configuration of catch 410, as well as the coupling between shifter 406 and cable 204, and the routing of cable 204 through an opening of base 414.

Figure 7:
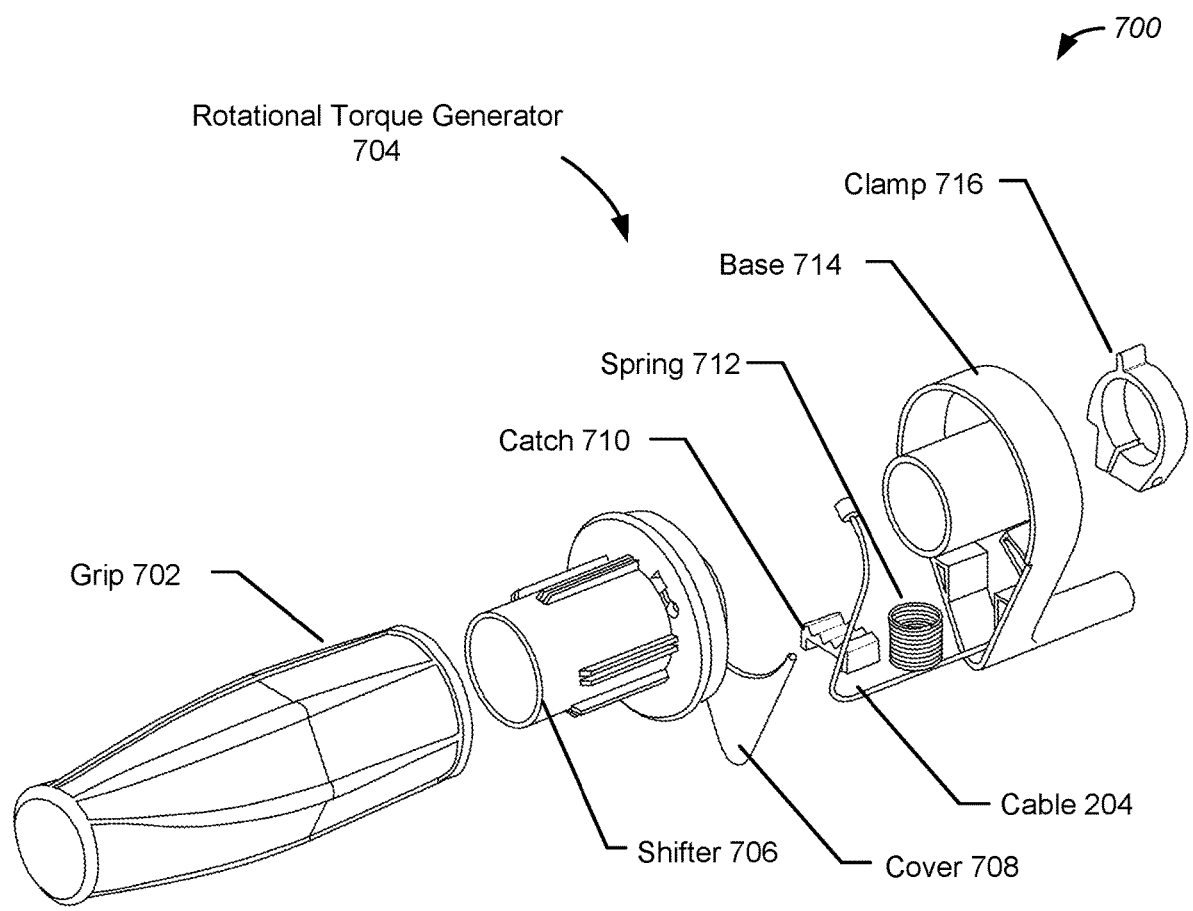
FIG. 7 illustrates yet another example of a handle, configured in accordance with some embodiments.

FIG. 7 illustrates yet another example of a handle, configured in accordance with some embodiments. As similarly discussed above, a handle, such as handle 700, may include various components, such as grip 702, and rotational torque generator 704 which may be coupled to cable 204. As shown in FIG. 7, rotational torque generator 704 may include various components that are configured to engage and disengage braking as discussed above. For example, rotational torque generator 704 may include shifter 706, cover 708, catch 710, spring 712, base 714, and clamp 716.

As similarly discussed above, shifter 706 is configured to mechanically couple to grip 702, and thus transfer rotational force from grip 702 to other components of rotational torque generator 704 and ultimately to cable 204 and its associated brakes. As also similarly discussed above, shifter 706 is configured to have one or more ridges that are configured to couple with grip 702 and provide mechanical coupling between the two. In various embodiments, shifter 706 is configured to couple with catch 710 via a mechanical interface. In one example, catch 710 is a detent that includes teeth that are configured to interface with teeth of shifter 706. Accordingly, the teeth included in catch 710 and shifter 706 may correspond to different braking positions and different amounts of braking. In a specific example, catch 710 is a detent that has a shape or geometry configured and contoured to fit into a curvature of base 714. As will be discussed in greater detail below with reference to FIG. 8, spring 712 and catch 710 may thus be integrated into a specific portion of base 714.

As also shown in FIG. 7, catch 710 is coupled to spring 712, and spring 712 is configured to provide a force that pushes catch 710 against shifter 706 at the interface, and ensures sufficient mechanical coupling between the two. In various embodiments, shifter 706 is coupled to cable 204 and this converts the previously described rotational force into a tension applied to cable 204. In this way, the positions corresponding to amounts of rotation are converted to amounts of force applied to cable 204, and amounts of braking applied to brakes coupled to cable 204. As discussed above, rotational torque generator 704 also includes base 714, clamp 716, and cover 708 which are configured to structural support and enclosure for the other components of rotational torque generator 704.

Figure 8:
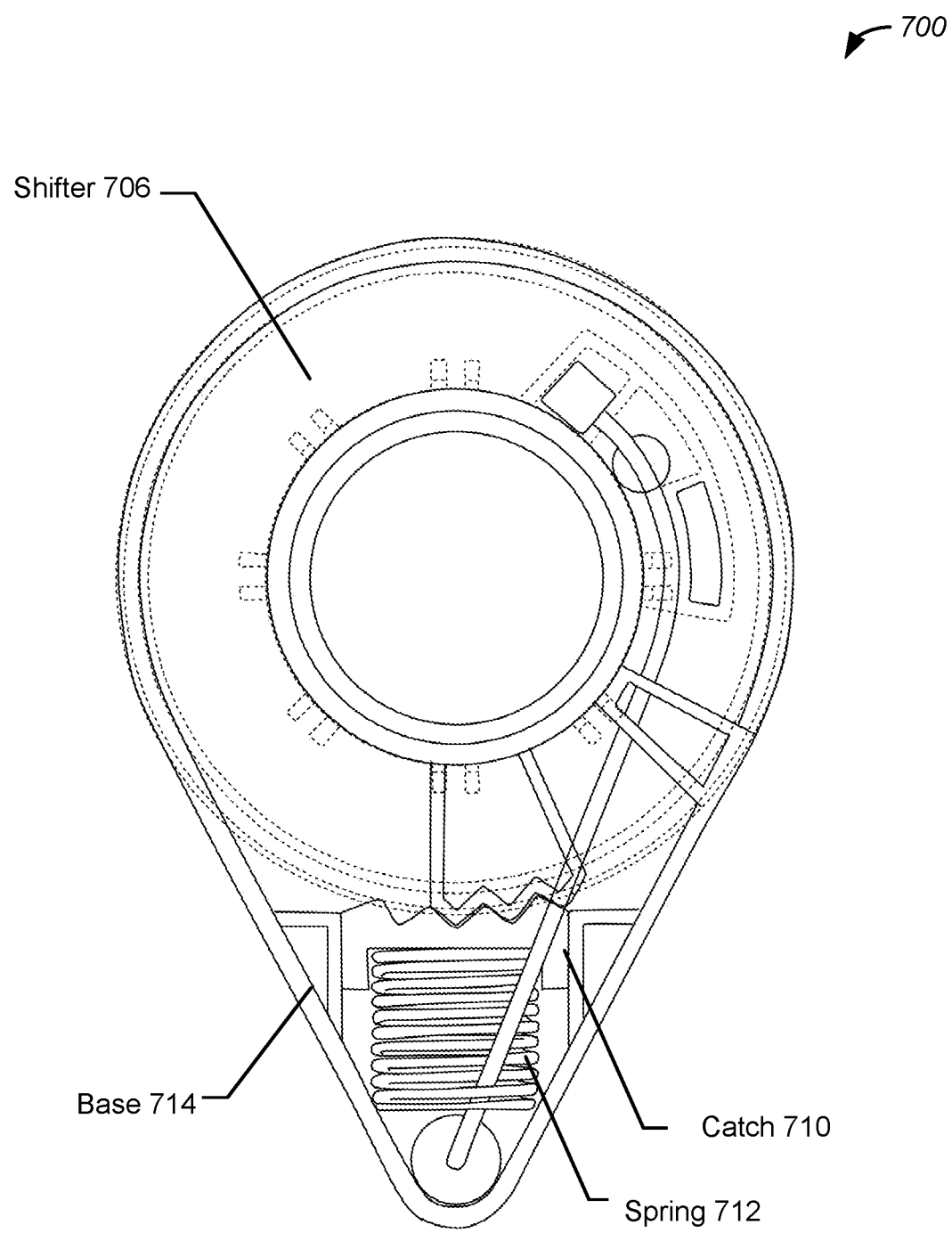
FIG. 8 illustrates another view of the handle, configured in accordance with some embodiments.

FIG. 8 illustrates another view of the handle, configured in accordance with some embodiments. As discussed above, handle 700, may include various components, such as shifter 706, catch 710, spring 712, and base 714. As shown in FIG. 8, catch 710 and spring 712 are recessed in a portion of base 714 to facilitate a compact form factor of catch 710 and spring 712. Accordingly, spring 712 pushes catch 710 upwards in accordance with a force determined by a spring constant of spring 712, and teeth of catch 710, which is configured as a detent, is pushed into teeth of shifter 706 at an interface. In this way, spring 712 may be configured to facilitate coupling between catch 710 and shifter 706. As shown in FIG. 8, catch 710 is a detent configured to have three grooves corresponding to three positions of shifter 706 that further correspond to three braking settings: not engaged, partially engaged, and fully engaged. It will be appreciated that various configurations of teeth and grooves may be implemented. For example, shifter 706 might have one or more teeth, and catch 710 might have three grooves. Moreover, more than three grooves may be used for additional braking settings.

Figure 9:
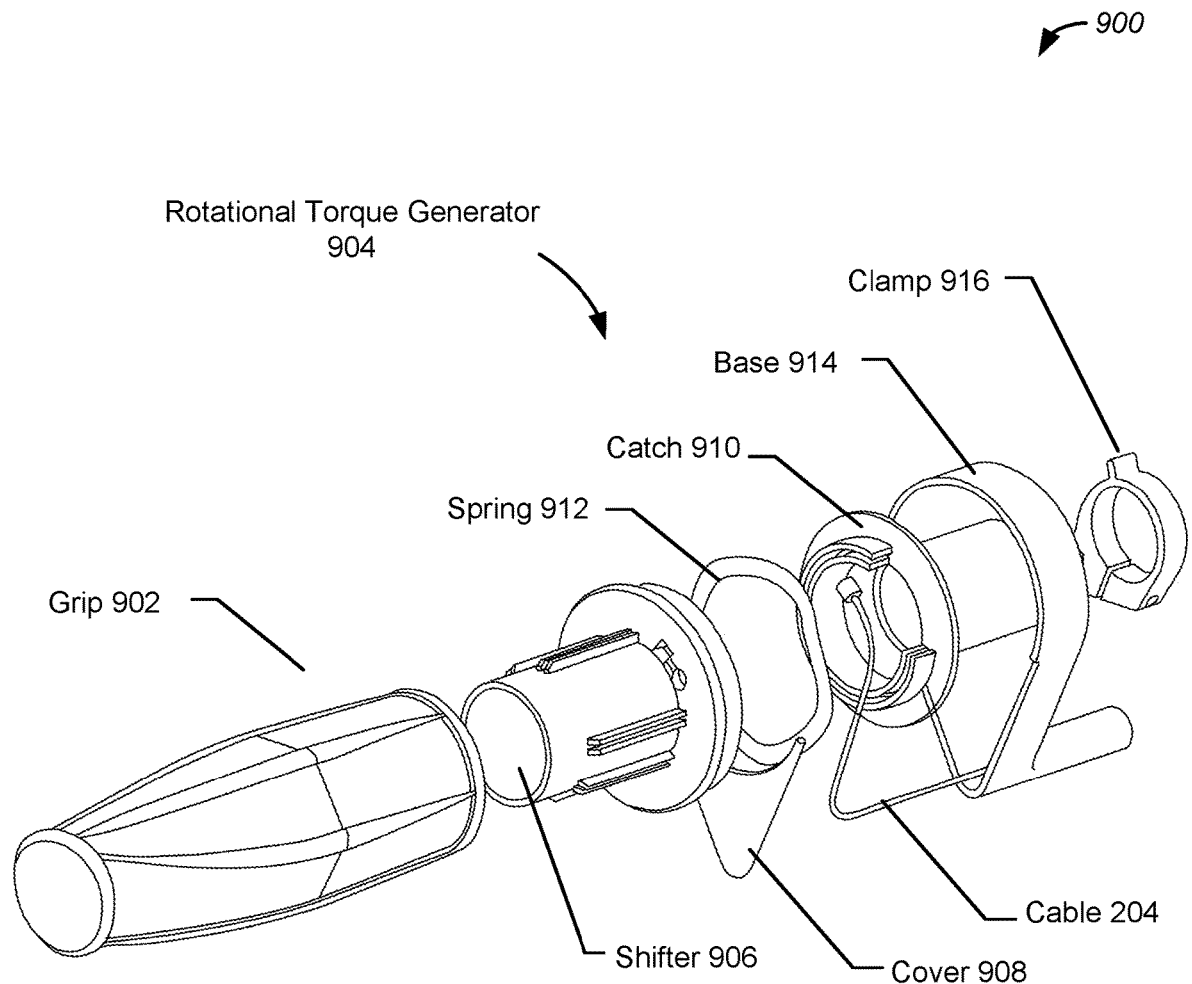
FIG. 9 illustrates an additional example of a handle, configured in accordance with some embodiments.

FIG. 9 illustrates an additional example of a handle, configured in accordance with some embodiments. Accordingly, a handle, such as handle 900, may include various components, such as grip 902, and rotational torque generator 904 which may be coupled to cable 204. As shown in FIG. 9, rotational torque generator 904 may include various components that are configured to engage and disengage braking as discussed above. For example, rotational torque generator 904 may include shifter 906, cover 908, catch 910, spring 912, base 914, and clamp 916.

As similarly discussed above, shifter 906 is configured to mechanically couple to grip 902, and thus transfer rotational force from grip 902 to other components of rotational torque generator 904 and ultimately to cable 204 and its associated brakes. As also similarly discussed above, shifter 906 is configured to have one or more mechanical coupling mechanisms, such as ridges, that are configured to couple with grip 902 and provide mechanical coupling between the two. In various embodiments, shifter 906 is also coupled to catch 910 such that they are configured to rotate together while still allowing of motion of catch 910 in direction 920, also referred to herein as a translational motion, relative to shifter 906 and base 914.

According to some embodiments, base 914 is configured to couple with catch 910 via a mechanical interface. In one example, catch 910 is a piston that includes teeth that are configured to interface with teeth of base 914. Accordingly, the teeth included in catch 910 and base 914 may correspond to different braking positions and different amounts of braking. Thus, as similarly discussed above, a number of teeth and grooves may correspond to a number of different amounts of braking determined by the different braking positions.

In a specific example, catch 910 is a piston that has a circular shape or geometry configured and contoured to fit into a curvature of shifter 906 and base 914. Moreover, a spring, such as spring 912 may be implemented between catch 910 and shifter 906. In various embodiments, spring 912 is a wave spring. As will be discussed in greater detail below, spring 912 may be a wave spring configured to facilitate selective coupling between base 914 and catch 910. Additional details regarding spring 912 are discussed in greater detail below with reference to FIGS. 10A and 10B. Moreover, while embodiments are disclosed herein that utilize springs, it will be appreciated that any suitable mechanism capable of storing mechanical energy may be used.

In various embodiments, shifter 906 is coupled to cable 204 and this converts the previously described rotational force into a tension, which may be a linear force, applied to cable 204. In this way, the positions corresponding to amounts of rotation are converted to amounts of force applied to cable 204, and amounts of braking applied to brakes coupled to cable 204. As discussed above, rotational torque generator 904 also includes base 914, clamp 916, and cover 908 which are configured to structural support and enclosure for the other components of rotational torque generator 904.

Figure 10A:
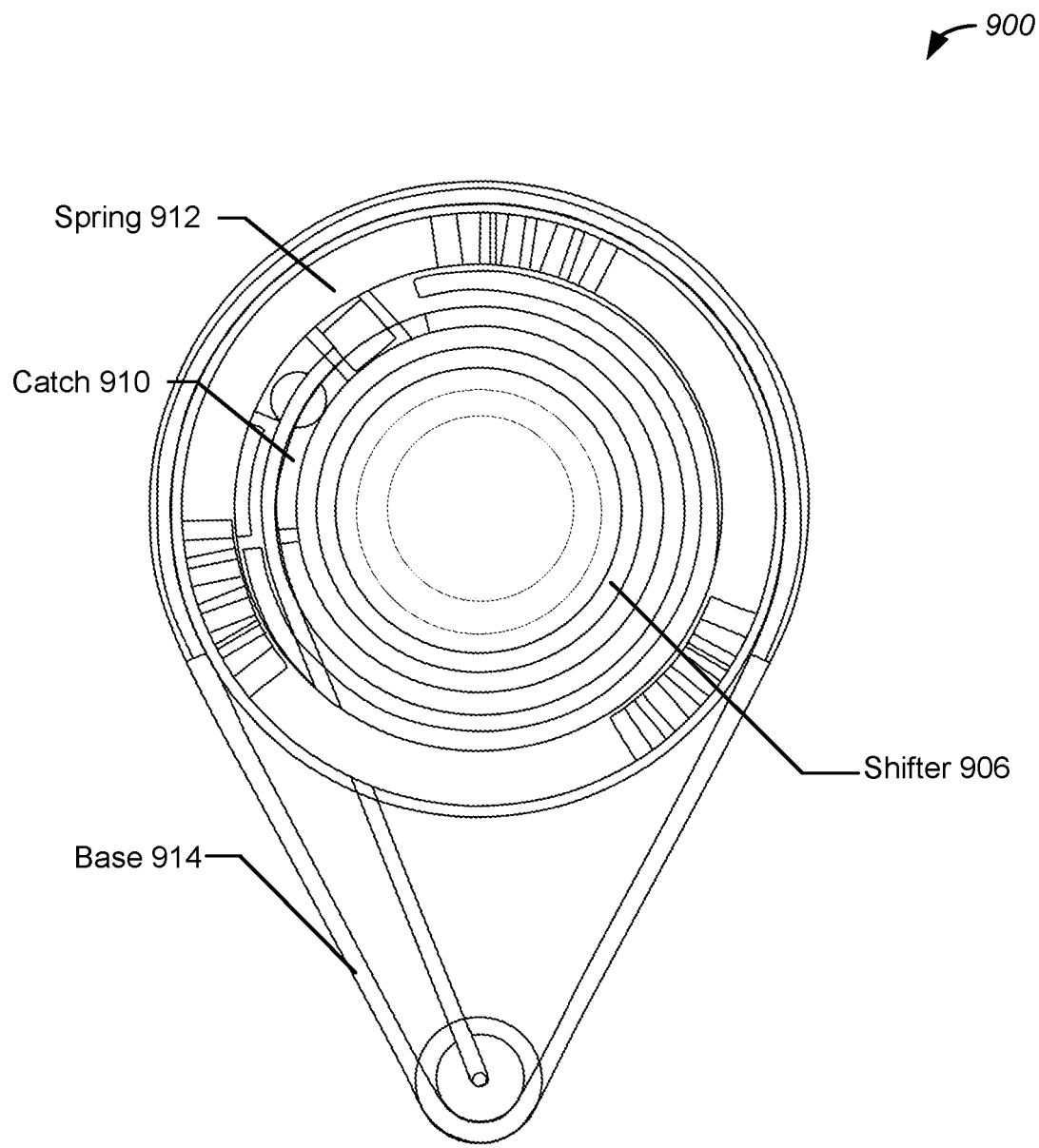
FIG. 10A illustrates another view of the handle, configured in accordance with some embodiments.

FIG. 10A illustrates another view of the handle, configured in accordance with some embodiments. As discussed above, handle 900, may include various components, such as shifter 906, catch 910, spring 912, and base 914. As shown in FIG. 10A, shifter 906, catch 910, and spring 912 may be arranged concentrically. Moreover, catch 910 and spring 912 may be housed within base 914. As also shown in FIG. 10A, catch 910 and base 914 may each have one or more regions or interfaces which each include several grooves and teeth. In one example, each catch 910 and base 914 has three interfaces to provide enhanced mechanical coupling between the two. It will be appreciated that any suitable number of interfaces may be used.

Figure 10B:
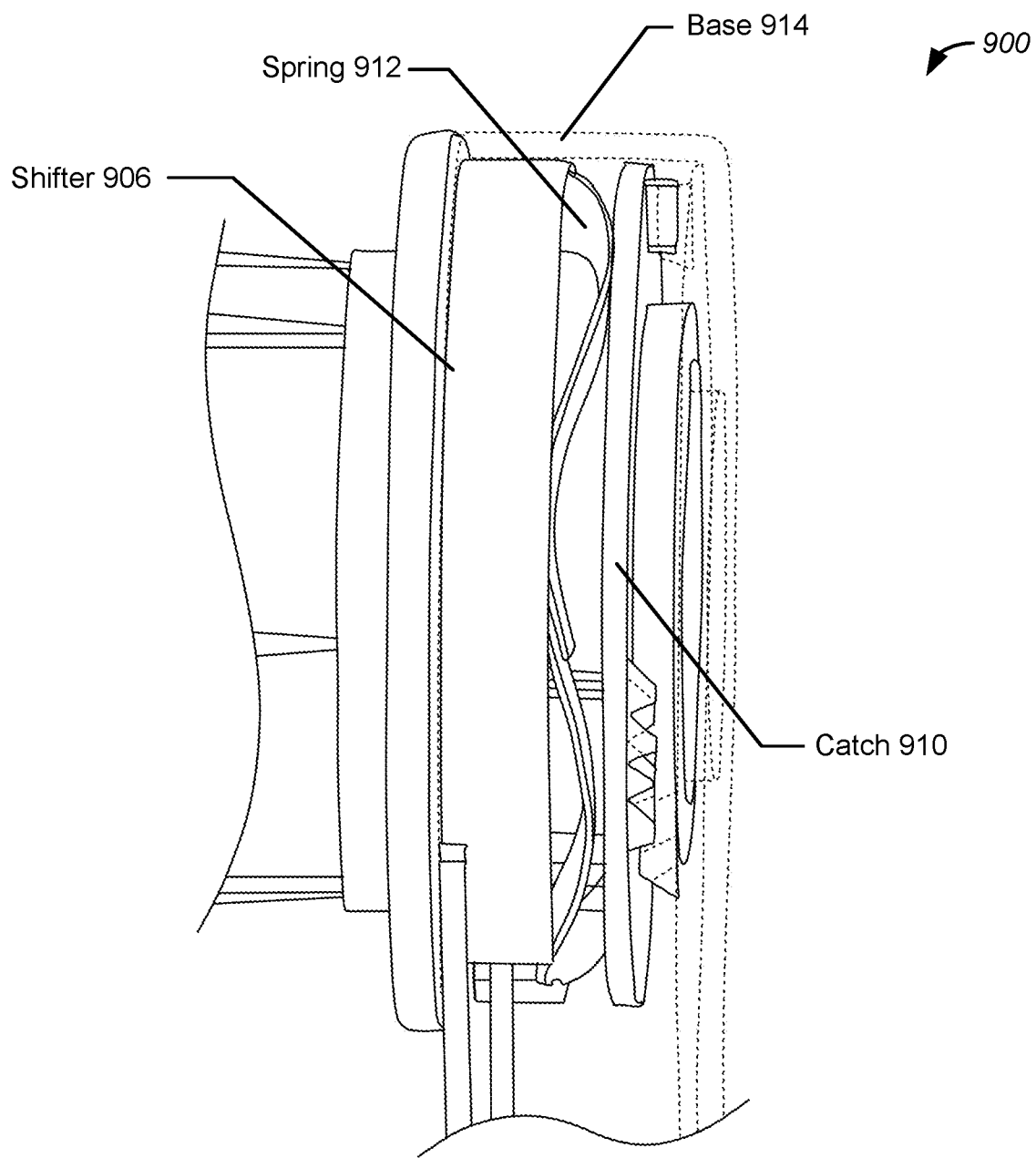
FIG. 10B illustrates yet another view of the handle, configured in accordance with some embodiments.

FIG. 10B illustrates yet another view of the handle, configured in accordance with some embodiments. Accordingly, FIG. 10B provides an additional view of shifter 906, catch 910, spring 912, and base 914 when spring 912 is a wave spring and when catch 910 is a piston. As also shown in FIG. 10B, catch 910 is capable of translational motion within base 914 to facilitate engagement and disengagement of the teeth of catch 910 and the teeth of base 914 at different rotational positions. Accordingly, shifter 906 and catch 910 may be coupled together such that they rotate together, and tensioned translational motion of catch 910 may be possible as different rotational positions are implemented relative to base 914.

Figure 11:
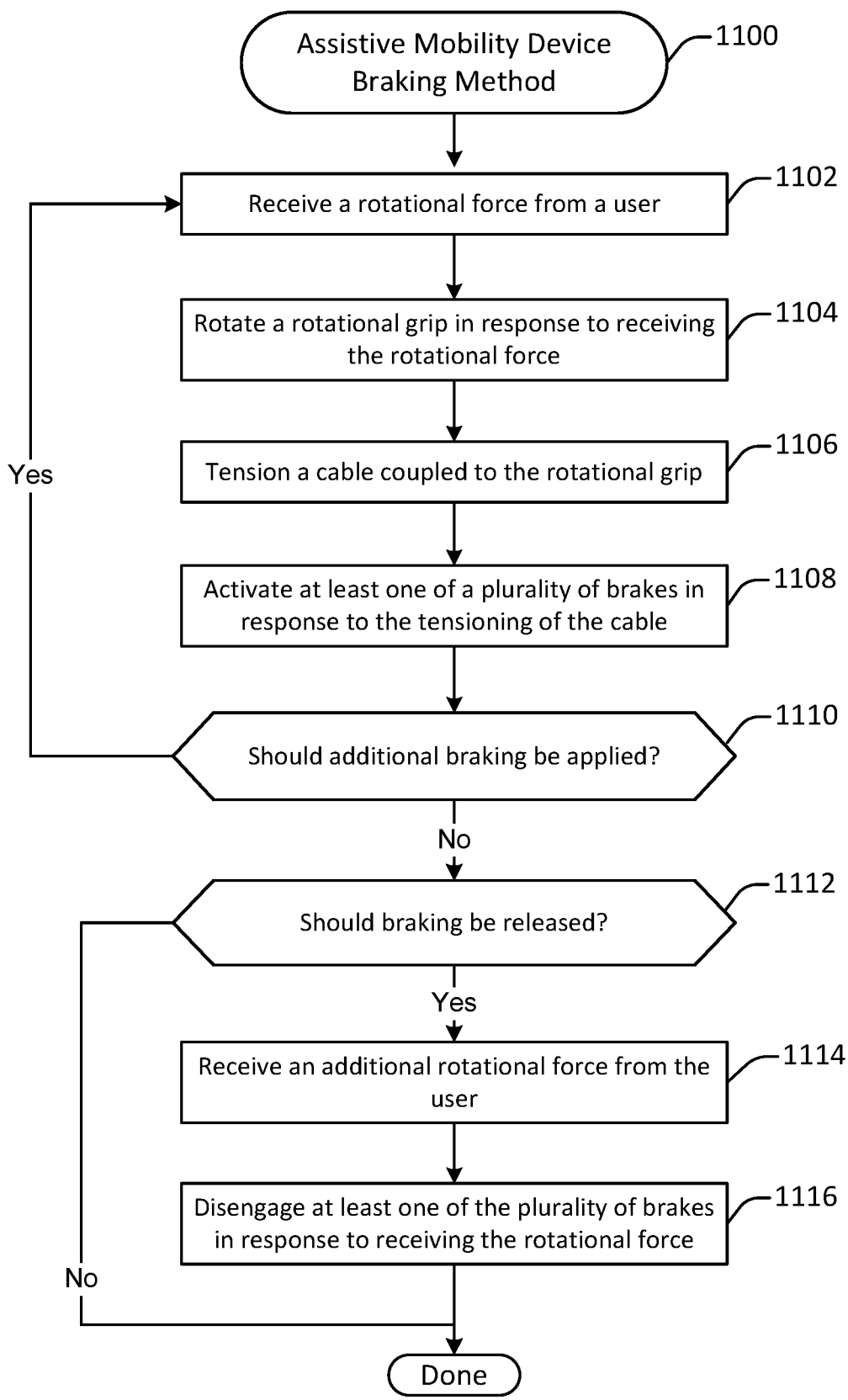
FIG. 11 illustrates a flow chart of an example of a method for using a brake system of an assistive mobility device, implemented in accordance with some embodiments.

FIG. 11 illustrates a flow chart of an example of a method for using a brake system of an assistive mobility device, implemented in accordance with some embodiments. As discussed above, an assistive mobility device may include a brake system that is configured to selectively engage a designated amount of braking to control or stop the motion of an assistive mobility device. As will be discussed in greater detail below, a method, such as method 1100, may be used to engage and disengage brakes of the brake system.

Accordingly, method 1100 may commence with operation 1102 during which a rotational force may be received from a user. In various embodiments, the rotational force may be received at a handle. For example, the force may be received at a grip of the handle, and may be provided by the user when an amount of braking is desired. For example, the user may intend to slow the motion of the assistive mobility device when traversing a decline or downward slope, or the user may intend to stop the motion of the assistive mobility device when remaining stationary and in a "parked" position.

Method 1100 may proceed to operation 1104 during which a rotational torque generator included in the handle is rotated in response to receiving the rotational force. As discussed above, the rotational torque generator may be coupled to the grip such that when the grip is rotated, the rotational torque generator is rotated as well. In this way, the rotational force may be transferred from the grip to the rotational torque generator.

Method 1100 may proceed to operation 1106 during which a cable coupled to the rotational torque generator may be tensioned based, at least in part, on the received rotational force. Accordingly, as discussed above, rotation of one or more components of the rotational torque generator may cause the cable to be tensioned and pulled a designated amount, as may be determined based on the configuration of the shifter and catch included within the rotational torque generator.

Method 1100 may proceed to operation 1108 during which at least one of a plurality of brakes may be activated in response to the tensioning of the cable. As also discussed above, the tensioning and movement of the cable may cause the movement of one or more components of a brake, such as a brake bar mounted on a pivot and coupled to a brake pad or brake bar. Accordingly, the brake may be moved to contact the wheel and apply an amount of braking to the wheel to slow or stop the movement of the wheel and its associated assistive mobility device.

Method 1100 may proceed to operation 1110 during which it may be determined if additional braking is being applied. In one example, additional braking may be applied if a user intends to apply more braking as may occur when going from a slow setting to a stop setting. Accordingly, if it is determined that additional braking is being applied, method 1100 may return to operation 1102. However, if it is determined that no additional braking is being applied, method 1100 may proceed to operation 1112.

Accordingly, during operation 1112, it may be determined if braking should be released. For example, a user may determine that resistance to motion of the assistive mobility device is no longer needed, and free motion of the assistive mobility device is again desired. In such a situation, the user may decide to release the brakes of the assistive mobility device. Accordingly, if it is determined that braking should not be released, method 1100 may terminate. However, if it is determined that braking should be released, method 1100 may proceed to operation 1114.

Accordingly, during operation 1114, a rotational force may be received from a user. As discussed above, the rotational force may be received at a handle, and may be transferred to various other components, such as the rotational torque generator and the cable. In various embodiments, the rotational force is in the opposite direction as that of operation 1102. Accordingly, the rotation of the rotational torque generator and the movement of its associated cable may be in the opposite direction.

Method 1100 may proceed to operation 1116 during which during which at least one of the plurality of brakes may be disengaged in response to the rotational force. Accordingly, the amount of braking that was previously applied may be reduced or removed entirely depending on the amount of force and rotation applied during operation 1114. In this way, the user may apply an additional rotational force to disengage the brake system and reinstate free motion of the assistive mobility device.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A walker system comprising:
   a frame configured to provide support for a user in state of walking;
   a plurality of wheels coupled to the frame and configured to enable motion of the frame to provide mobility assistance to the user while the user is walking;
   a plurality of brakes coupled to the plurality of wheels and configured to provide resistance to a rotation of the plurality of wheels when engaged; and
   a first handle coupled to the frame and configured to be grasped by the user, the first handle comprising:
   a first rotatable grip;
   a first rotational torque generator coupled to the first rotatable grip and further coupled to one of the plurality of brakes and configured to control an amount of braking applied by the one of the plurality of brakes, wherein the first rotational torque generator includes discrete set points each corresponding to a different amount of braking, wherein the grip is used to rotate the first rotational torque generator between the set points, and wherein when rotated to one of the set points the first rotational torque generator will maintain that set point after the grip is released.

2. The system of claim 1 further comprising a second handle coupled to the frame and configured to be grasped by the user, the second handle having a second rotatable grip and a second rotational torque generator coupled to the second rotatable grip and further coupled to another of the plurality of brakes.

3. The system of claim 1, wherein a first amount of braking associated with the first set point applies less braking than a second amount of braking associated with the second set point.

4. The system of claim 1, wherein the first rotational torque generator comprises a catch and a spring configured to implement the first set point and the second set point.

5. The system of claim 4, wherein the catch is a pawl coupled to the spring, and wherein the pawl comprises a plurality of teeth corresponding to the first set point and the second set point.

6. The system of claim 4, wherein the catch is a detent coupled to the spring, and wherein the detent comprises a plurality of teeth corresponding to the first set point and the second set point.

7. The system of claim 4, wherein the catch is a piston coupled to the spring and a base, and wherein the piston and the base each comprise a plurality of teeth corresponding to the first set point and the second set point.

8. The system of claim 4, wherein the first rotational torque generator is coupled to the plurality of brakes via a first cable.

9. The system of claim 8, wherein the first cable is coupled to the catch of the first rotational torque generator.

10. An assistive mobility device comprising:
a frame configured to provide support for a user in state of walking;
a plurality of wheels coupled to the frame and configured to enable motion of the frame to provide mobility assistance to the user while the user is walking;
a plurality of brakes coupled to the plurality of wheels and configured to provide resistance to a rotation of the plurality of wheels when engaged; and
a first rotatable grip coupled to a first rotational torque generator, the first rotational torque generator connected to one of the plurality of brakes and configured to control an amount of braking applied by the one of the plurality of brakes, wherein the first rotational torque generator includes discrete set points each corresponding to a different amount of braking, wherein the grip is used to rotate the first rotational torque generator between the set points, and wherein when rotated to one of the set points the first rotational torque generator will maintain that set point after the grip is released.

11. The device of claim 10, further comprising a second rotatable grip with a second rotational torque generator connected to another of the plurality of brakes.

12. The device of claim 10, wherein the first rotational torque generator comprises a catch and a spring configured to implement the first set point and the second set point.

13. The device of claim 12, wherein the catch is a pawl coupled to the spring, and wherein the pawl comprises a plurality of teeth corresponding to the first set point and the second set point.

14. The device of claim 12, wherein the catch is a detent coupled to the spring, and wherein the detent comprises a plurality of teeth corresponding to the first set point and the second set point.

15. The device of claim 12, wherein the catch is a piston coupled to the spring and a base, and wherein the piston and the base each comprise a plurality of teeth corresponding to the first set point and the second set point.

* * * * *